United States Patent
Guo et al.

(10) Patent No.: US 11,804,597 B2
(45) Date of Patent: Oct. 31, 2023

(54) SILICON LITHIUM ION ELECTRODE MATERIALS

(71) Applicant: The Regents of the University of California, Oakland, CA (US)

(72) Inventors: Juchen Guo, Anaheim, CA (US); Zheng Yan, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 250 days.

(21) Appl. No.: 16/976,708

(22) PCT Filed: Feb. 27, 2019

(86) PCT No.: PCT/US2019/019876
§ 371 (c)(1),
(2) Date: Aug. 28, 2020

(87) PCT Pub. No.: WO2019/169019
PCT Pub. Date: Sep. 6, 2019

(65) Prior Publication Data
US 2021/0057737 A1  Feb. 25, 2021

Related U.S. Application Data

(60) Provisional application No. 62/636,561, filed on Feb. 28, 2018.

(51) Int. Cl.
*H01M 4/38* (2006.01)
*H01M 4/04* (2006.01)
(Continued)

(52) U.S. Cl.
CPC ......... *H01M 4/386* (2013.01); *H01M 4/0419* (2013.01); *H01M 4/0471* (2013.01);
(Continued)

(58) Field of Classification Search
CPC ........ H01M 4/38; H01M 4/133; H01M 4/134; H01M 4/131; H01M 4/04; H01M 4/36; H01M 10/0525
See application file for complete search history.

(56) References Cited

U.S. PATENT DOCUMENTS

2014/0147751 A1   5/2014   Yang et al.

FOREIGN PATENT DOCUMENTS

| CN | 102157731 A | 8/2011 |
|---|---|---|
| CN | 104362315 A | 2/2015 |

(Continued)

OTHER PUBLICATIONS

Shen et al., "Magnesiothermically reduced diatomaceous earth as a porous silicon anode material for lithium ion batteries", Journal of Power Sources 213, p. 229-232, Apr. 19, 2012.*
Richman et al., "Ordered Mesoporous Silicon through Magnesium Reduction of Polymer Templated Silica Thin Films", Nano Lett. 8, 9, pp. 3075-3079, Aug. 15, 2008.*
Bao et al., "Chemical reduction of three-dimensional silica microassemblies into microporous silicon replicas", Nature vol. 446, pp. 172-175, Mar. 8, 2007.*

(Continued)

*Primary Examiner* — Kenneth J Douyette
(74) *Attorney, Agent, or Firm* — SCHWEGMAN LUNDBERG & WOESSNER, P.A.

(57) ABSTRACT

An electrode for use in a battery includes a silicon-carbon composite with graphite. The silicon-carbon composite structure is microporous. The silicon-carbon composite can be made by dry spraying and magnesiothermically reducing silicon, followed by deposition of carbon.

8 Claims, 37 Drawing Sheets

(51) Int. Cl.
- *H01M 4/13* (2010.01)
- *H01M 4/36* (2006.01)
- *H01M 10/0525* (2010.01)
- *H01M 4/131* (2010.01)
- *H01M 4/133* (2010.01)
- *H01M 4/134* (2010.01)
- *H01M 4/1391* (2010.01)
- *H01M 4/1393* (2010.01)
- *H01M 4/1395* (2010.01)
- *H01M 4/62* (2006.01)
- *H01M 4/02* (2006.01)

(52) U.S. Cl.
CPC .......... *H01M 4/131* (2013.01); *H01M 4/133* (2013.01); *H01M 4/134* (2013.01); *H01M 4/1391* (2013.01); *H01M 4/1393* (2013.01); *H01M 4/1395* (2013.01); *H01M 4/364* (2013.01); *H01M 4/366* (2013.01); *H01M 4/625* (2013.01); *H01M 10/0525* (2013.01); *H01M 2004/021* (2013.01)

(56) References Cited

FOREIGN PATENT DOCUMENTS

| | | | |
|---|---|---|---|
| CN | 105958047 | A | 9/2016 |
| CN | 106374088 | A | 2/2017 |
| CN | 106450246 | A | 2/2017 |
| CN | 106784743 | A | 5/2017 |
| CN | 107140641 | A | 9/2017 |
| CN | 107611416 | A | 1/2018 |
| CN | 111936419 | | 11/2020 |
| WO | WO 2018205761 | A1 * | 11/2018 |

OTHER PUBLICATIONS

International Application Serial No. PCT/US2019/019876, International Search Report dated May 30, 2019, 3 pgs.
International Application Serial No. PCT/US2019/019876, Written Opinion dated May 30, 2019, 6 pgs.
Hong, I, et al., "Mesoporous, Si/C composite anode for Li battery obtained by 'magnesium-thermal' reduction process", Solid State Ionics, vol. 232, (Feb. 7, 2013), 24-28.
Jung, Dae Soo, et al., "Recycling rice husks for high-capacity lithium battery anodes", Proc. of the National Academy of Science, 110(30), (Jul. 23, 2013), 6 pgs.
Li, M, et al., "Facile spray-drying/pyrolysis synthesis of core-shell structure graphite/silicon-porous carbon composite as a superior anode for Li-ion batteries", Journal of Power Sources, vol. 248, (Feb. 15, 2014), 721-728.
Liu, J, et al., "Energy Storage Materials from Nature through Nanotechnology: A Sustainable Route from Reed Plants to a Silicon Anode for Lithium-Ion Batteries", Angewandte Chemie International Edition, vol. 127, (Aug. 10, 2015), 9768-9772.
Shen, L, et al., "Carbon-coated hierarchically porous silicon as anode material for lithium ion batteries", RSC Advances, vol. 4, No. 29, (2014), 15314-15318.
"International Application Serial No. PCT US2019 019876, International Preliminary Report on Patentability dated Sep. 10, 2020", 8 pgs.
"Chinese Application Serial No. 201980016033.6, Notification to Make Rectification dated Sep. 15, 2020", with English translation, 2 pages.
Chinese Application Serial No. 201980016033.6, Office Action dated Dec. 8, 2022, w/ English Translation, 15 pgs.
Chinese Application Serial No. 201980016033.6, Response filed Apr. 21, 2023 to Office Action dated Dec. 8, 2022, w/ English Claims, 13 pgs.

\* cited by examiner

20 μm

20 μm 100 nm 100 nm

SILICON LITHIUM ION ELECTRODE MATERIALS

CROSS REFERENCE TO RELATED APPLICATIONS

This application is a U.S. National Stage Filing under 35 U.S.C. 371 from International Application No. PCT/US2019/019876, filed on Feb. 27, 2019, and published as WO 2019/169019 A1 on Sep. 6, 2019, which claims the benefit of priority to U.S. Patent Provisional Application No. 62/636,561, filed on Feb. 28, 2018, each of which is incorporated by reference herein in its entirety.

TECHNICAL FIELD

This invention relates to battery cell devices and methods. In one example, this invention relates to lithium ion batteries.

BACKGROUND

Improved batteries, such as lithium ion batteries are desired. New materials and microstructures are desired to increase capacity, and to mitigate issues with silicon-based electrode materials.

DETAILED DESCRIPTION

Figure 1A:
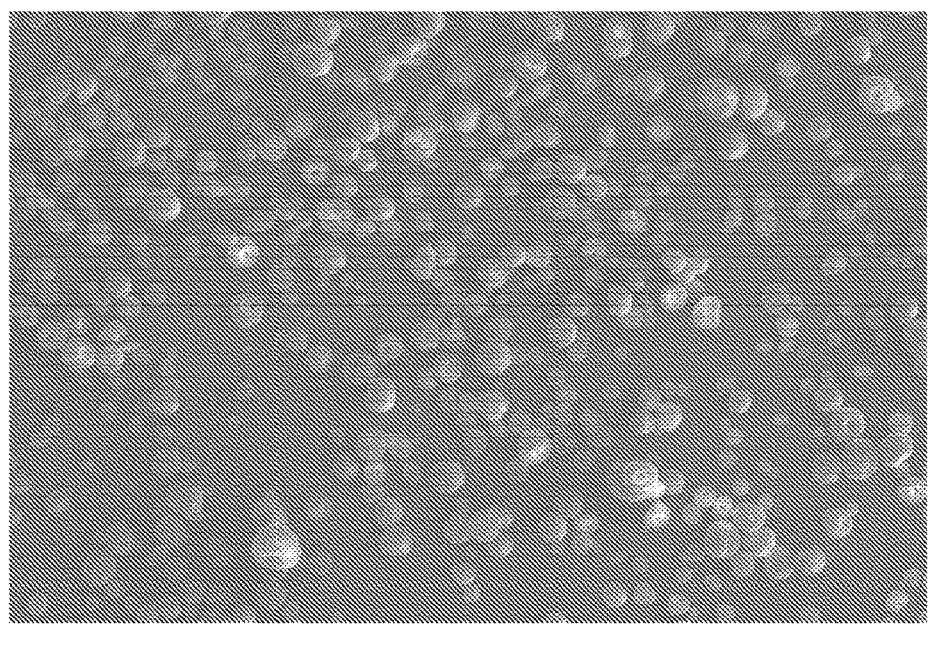
FIGS. 1A-1D are scanning electron microscopy (SEM) and transmission electron microscopy (TEM) images of silicon oxide nanoparticles.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

A highly scalable and cost-effective synthesis route to produce silicon (Si) and silicon-carbon (Si—C) composite for Li-ion anode materials utilizes spray drying, magnesiothermic reduction, and chemical vapor deposition (CVD). Commercial nanosized silica water suspension (LUDOX HS-40) was employed as the Si precursor. Diluted silica ($SiO_2$) water suspension was spray-dried via an aerosol spray dryer. Subsequent magnesiothermic reduction for the mixture of spray-dried $SiO_2$, magnesium (Mg) powder and NaCl, served as the heat scavenger to preserve porous architecture as secondary composite structure during the conversion of $SiO_2$ to Si, was performed. After a thin layer of carbon was deposited via CVD onto and in the pores, the Si—C composites show excellent capacity of 1835 mAh $g^{-1}$ and outstanding cycle stability for 100 cycles. As a promising Li-ion batteries anode material, Si—C/graphite hybrid thick electrodes reveal remarkable performance, achieved 850 mAh $g^{-1}$ specific capacity and 3 mAh $cm^{-2}$ areal capacity as well as 9X % capacity retention after 200 cycles vs. $2^{nd}$ cycle.

Silicon (Si) is a promising candidate as an anode material for next generation lithium-ion (Li-ion) batteries, due to its ultra-high theoretical capacity of 4200 mAh/g. This capacity is 10 times higher than most widely commercialized anode material graphite. However, technical challenges such as electrode fracture and particle pulverization induced by up to 300% of volume change during the transition between lithiation and delithiation, the formation of unstable solid-electrolyte interphase (SEI), and intrinsic poor conductivity of silicon has hindered the practical applications of Si-based anode materials. Particle pulverization can be prevented by nanosizing Si particle beneath critical breaking size. Nonetheless, constant volume change can destabilize the SEI. Continual electrolyte decomposition coupled with the poor conductivity of Si, results in irreversible capacity loss, causing eventual cell failure.

Nowadays, particle applications of silicon-graphite composites as hybrid anodes are unable to address the issues caused by Si volume change. Si—C composites are promising. A secondary structure of conformal carbon can be used to accommodate Si volume changes during lithiation and delithiation and provide better conductivity. Various nanostructures of Si—C composites have been reported, such as sandwich-structured Si nanoparticles, pomegranate-like Si—C, yolk-shell Si—C and carbon coated Si. However, the primary nanosized silicon has typically been synthesized via liquid chemical methods or chemical vapor deposition using silicon (IV) chloride ($SiCl_4$) or pyrophoric silane ($SiH_4$), which is costly, not environmentally friendly, and unscalable, limiting the commercial application of these methods.

Magnesiothermic reduction reaction (MRR) has gained attention, as $SiO_2$ can be reduced by Mg and regraded as a promising synthesis method for Si. It is inexpensive, high scalable. Si materials reduced by Mg exhibit good electrochemical performance. However, it is hard to preserve original $SiO_2$ structure during this violently exothermic reaction, as high local temperature could surpass the Si melt point. A heat scavenger, such as sodium chloride (NaCl), can be used to absorb large amounts heat generated by MRR, preventing Si nanoparticles aggregation and structural failure. Another challenge is the byproducts formation during magnesiothermic reduction, such as magnesium silicate ($Mg_2SiO_4$) or magnesium silicide ($Mg_2Si$).

Here, magnesiothermic reduction of spray-dried $SiO_2$ derived from commercial $SiO_2$ is used synthesize high-performance Si—C composite in the following reaction (1):

$$SiO_2 + 2Mg \rightarrow Si + 2MgO \quad (1)$$

Uniform carbon coating via chemical vapor deposition (CVD) can improve the conductivity of the composites and promote stable solid electrolyte inter-phase (SEI) layer formation on the Si surface. This is beneficial to the performance of Si anode material. Meanwhile, nanosized Si particles and create void space during the magnesiothermic reduction reaction. This void space can alleviate particle pulverization and accommodate volumetric expansion of Si induced by lithiation.

First, silicon was prepared. Commercial $SiO_2$ water suspension (LUDOX HS-40) was diluted with deionized water. The obtained suspension was spray-dried with a customized aerosol spray dryer at 120° C. The obtained spray-dried $SiO_2$ was further pulverized and thoroughly mixed with the magnesium (Mg) powder (300 mesh) with molar ratio of $Mg/SiO_2$=2.2:1 and sodium chloride (NaCl) with mass ratio Mg/NaCl=1:1 in a mechanical mixer for 1 hours. In a typical magnesiothermic reduction reaction (MRR), 270 mg of the mixture was sealed in a stainless-steel reactor (5 mL) under argon (Ar) filled environment. The reactor was slowly heated in a tube furnace at 1° C. min$^{-1}$ from room temperature to 600° C. for 1 h, 3 h, 6 h, 9 h and 12 h respectively. After cooling down to room temperature, the as-synthesized materials were washed with 45 mL of 2M HCl solution ($H_2O$: Ethanol=1:1 by volume) for 12 h to remove MgO and unreacted Mg, then 1 ml HF (49 wt. %) was added into the solution to remove unreacted $SiO_2$. The resulting Si materials were washed with distilled water and ethanol and collected via vacuum filtration. Final products were dried in vacuum oven for at least 12 h. NaCl was investigated as heat scavenger in the magnesiothermic reduction.

Carbon coating of the as-prepared final product is performed via CVD. Typically, 100 mg Si—C composite was loaded in a quartz tube reactor. After purging with Ar (100 sccm) for 60 min, the reactor was heated with ramp rate 10° C. min$^{-1}$ to 700° C. After reaching the temperature, acetylene ($C_2H_2$) and argon gas mixture was introduced with flow rate $C_2H_2$/Ar=10/20 sccm for 30 min while rotating the tube reactor. Finally, during cooling down to room temperature, acetylene was cut off and argon was kept filling into the reactor and carbon coated Si—C composite was collected.

The composition of the products was analyzed by X-ray diffraction (XRD). The internal morphologies of the Si and Si—C were analyzed by transmission electron microscopy (TEM) at an acceleration voltage of 120 kV. The surface morphologies were observed on a scanning electron microscope (SEM). The surface area was calculated from the N2 adsorption and desorption isotherms with the Brunauer-Emmett-Teller (BET) method. Pore size distributions were estimated by the Barrett-Joyner-Halenda (BJH) method.

Electrochemical measurements were performed with two-electrode coin type cells. The working electrode is composed of 80 wt. % of the Si, 10 wt. % of sodium carboxymethyl cellulose (CMC) as binder, and 10 wt. % of carbon black (Super-P). The electrolyte was composed of Lithium hexafluorophosphate ($LiPF_6$) solution (1M) in a mixture of ethylene carbonate (EC), diethyl carbonate (DEC) and Fluoroethylene carbonate (FEC) (volume ratio of EC:DEC:FEC=45:45:10). And lithium foil is used as the counter electrode with porous polypropylene separator. Galvanostatic cycling was performed between 0.01 and 1.2 V vs Li/Li$^+$ with a current density of 100 mA g$^{-1}$ for Si electrode, 100 mA g$^{-1}$ and 500 mA g$^{-1}$ for Si—C thick electrode.

Morphology of $SiO_2$ NPs was obtained via TEM (FIG. 1D), after spray drying by aerosol spray dryer, apple shaped spray-dried $SiO_2$ NPs agglomerate was obtained. Both TEM and SEM were performed to characterize the morphology, SEM images of particles at low magnification (FIG. 1A) and a high magnification SEM & TEM image was shown in (FIGS. 1B-1C) the right after mixing $SiO_2$, Mg and NaCl powder was preformed SEM and EDX mapping (FIGS. 2A-2F). EDX mapping indicates a uniform distribution of Si, Cl, Mg, and Na elements.

Figure 3A:
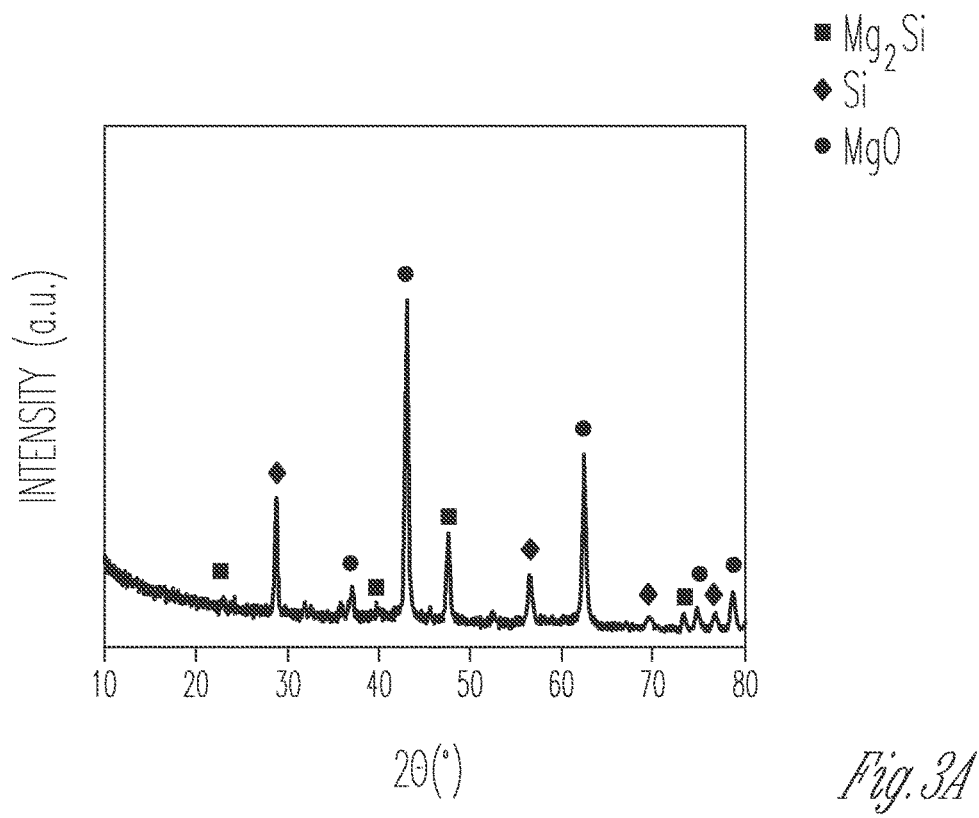
FIG. 3A shows x-ray crystallography (XRD) data for silicon oxide nanoparticles mixed with magnesium powder for the magnesiothermic reaction.
Figure 3B:
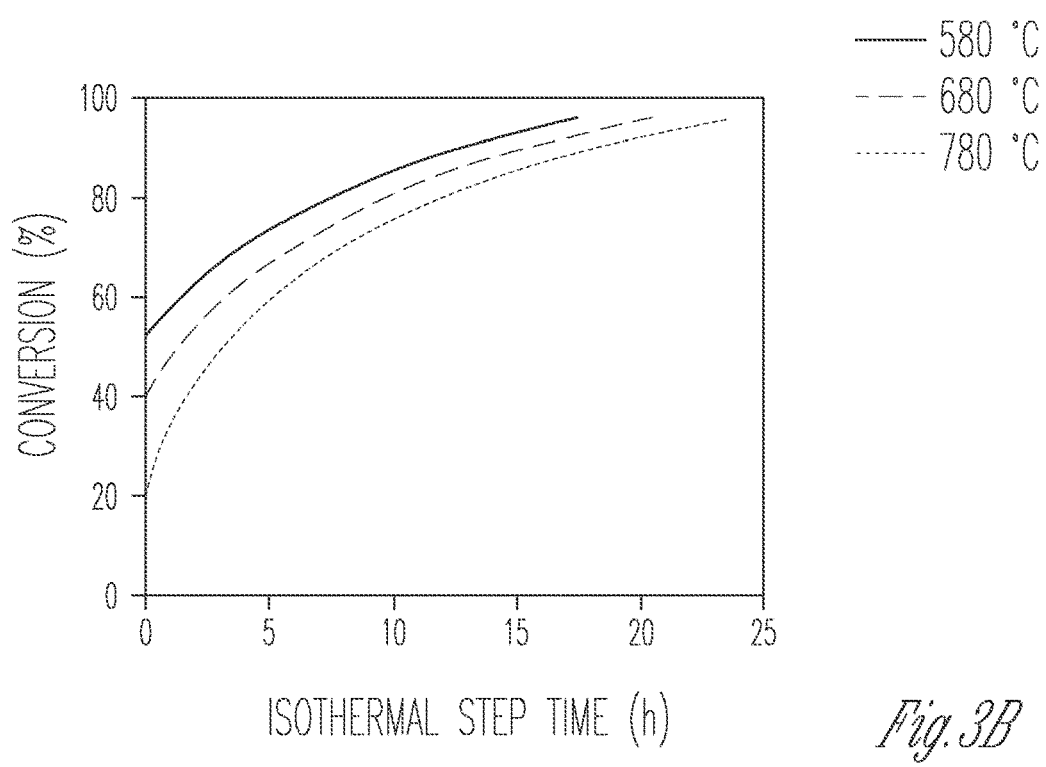
FIG. 3B shows kinetics for the isothermal step of the magnesiothermic reaction of silicon oxide nanoparticles.

The preliminary reaction was well mixed spray-dry $SiO_2$ and Mg with molar ratio 1:2.2 in stainless steel reactor. A thermocouple was employed and put inside of the reactor monitoring the onsite temperature. MMR initial temperature is around 540° C., a huge temperature spike observed, onsite temperature jumped over 1600° C. shows in FIGS. 4A-4F, meanwhile micro Si particles as well as $Mg_2Si$ were observed (FIGS. 3A-3B). So, the inability to maintain original architecture and byproduct formations could result from this extremely high local temperature. Then, the heat scavenger NaCl was added in to the Si precursor and Mg mixture. Three isothermal step temperatures were chosen: 600° C., 700° C. and 800° C., and isothermal time 1 h, 3 h, 6 h, 9 h, and 12 h were set. The measured onsite Isothermal step temperatures were 580° C., 680° C. and 780° C. respectively (FIGS. 4A-4F), and all the conversions under different reaction conditions were obtained. FIG. 4E shows that temperature and isothermal step duration both contributed to promote the conversion. According to the temperature monitoring graphs, a huge temperatures spike following the initiation of the MRR was not observed. The conversion under every condition was the average of three experiment results. With these conversions, a kinetics study was performed, Ginstling-Brounshtein model: was employed, which is a kinetics model for solid-state reaction and accurate for high yield. The averaged data were put into to the model and the model fitting was showed in FIG. 4F and the fitting results indicated the rate constant for 580° C., 680° C. and 780° C. is 0.01/h, 0.0108/h and 0.0116/h respect. With these rate constant, prediction of conversion under certain time and temperature is show in the FIG. 3B.

XRD was performed for all MRR performed at 580° C. sample under different duration, both after MRR and after acid treatments. XRD patterns of right after MRR (FIG. 5A) show the peaks indexed to NaCl, which was added in as heat scavenger, Si and MgO, which is formed by the following reaction (2):

$$SiO_2 + 2Mg \rightarrow Si + MgO \quad (2)$$

There was no trace of $Mg_2Si$ or $Mg_2SiO_4$ byproduct. MgO, unreacted $SiO_2$, and NaCl were removed by HCl and HF water/ethanol (v/v=50/50) solution etching and XRD patterns of after acid treatment samples (FIG. 5B) show the only existence of a pure silicon phase. From the full length at half maximum of the peaks and combined with Sharrer equation, this indicates that the crystal growth is favored by the longer isothermal time.

Figure 9A:
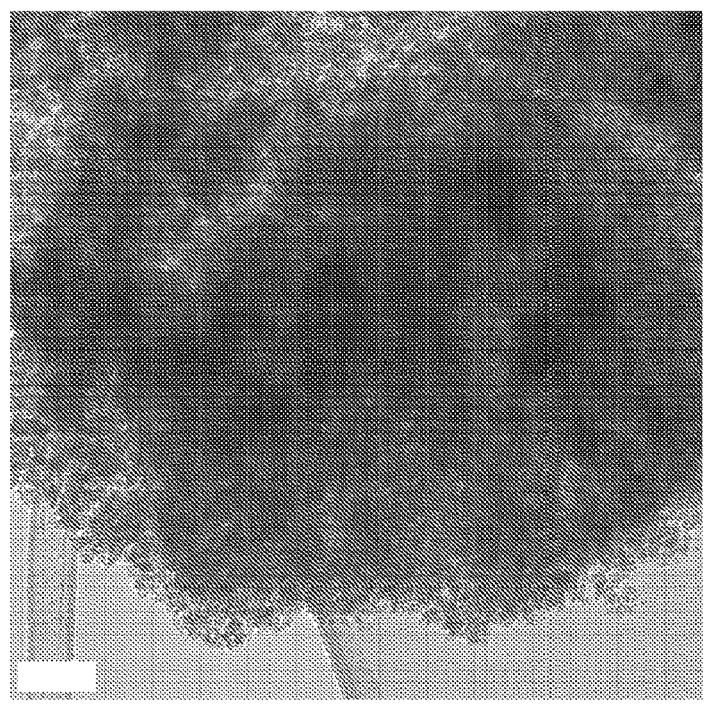
FIGS. 9A-9E are TEM images of the products of the magnesiothermic reaction.
Figure 9B:
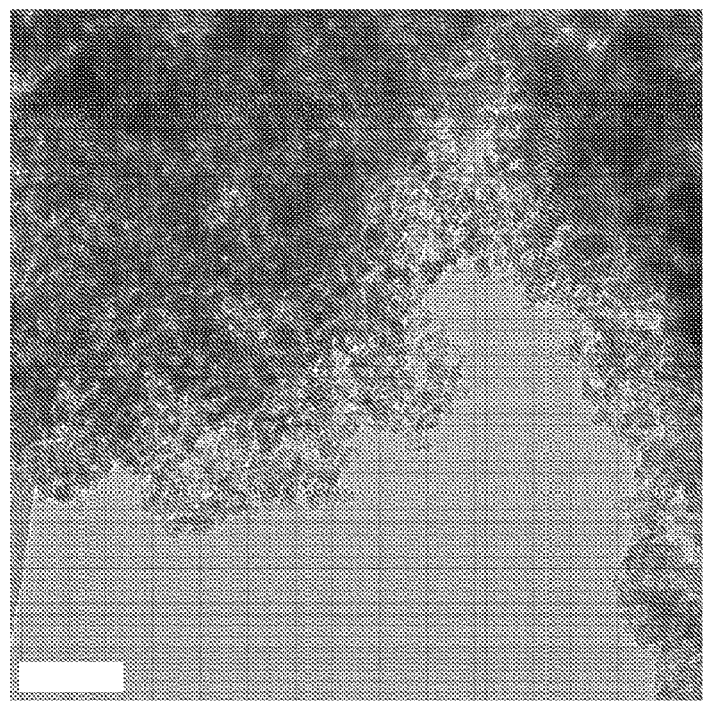
Figure 9C:
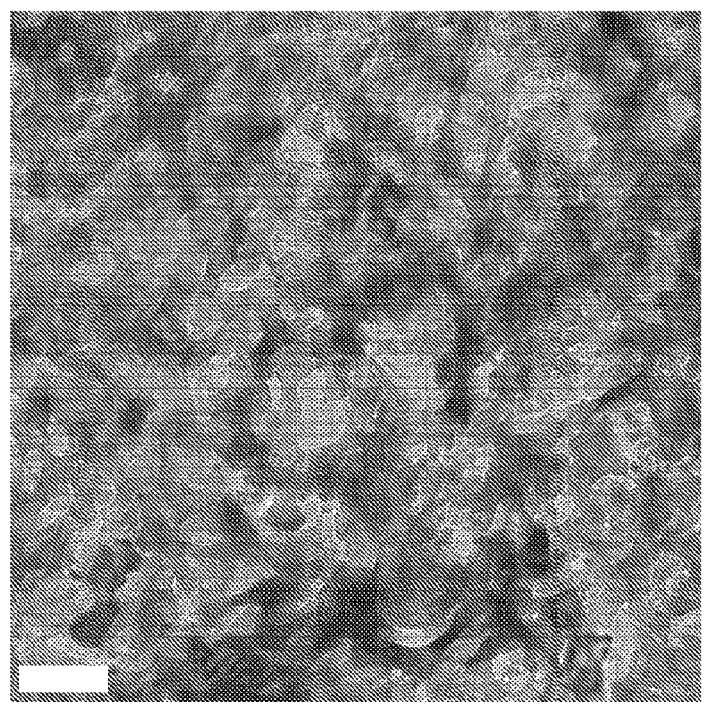
Figure 9D:
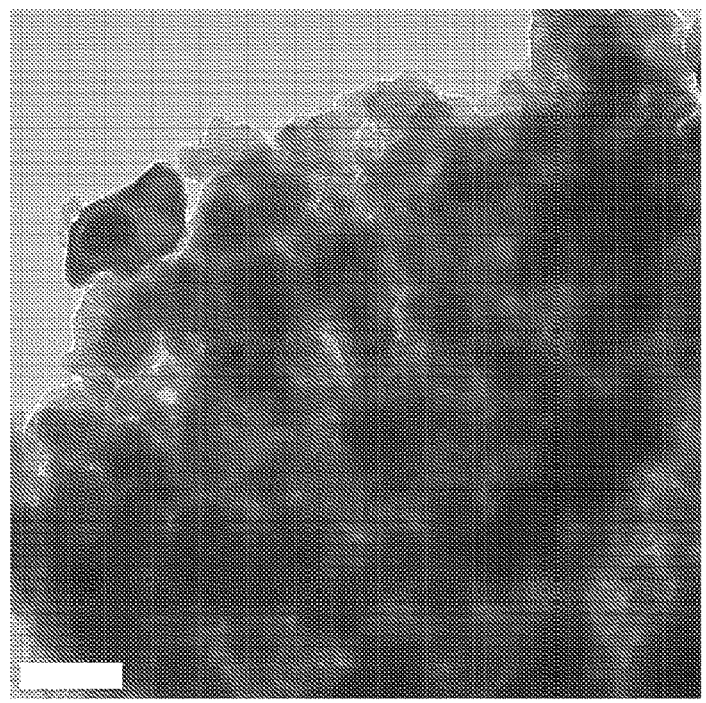
Figure 9E:
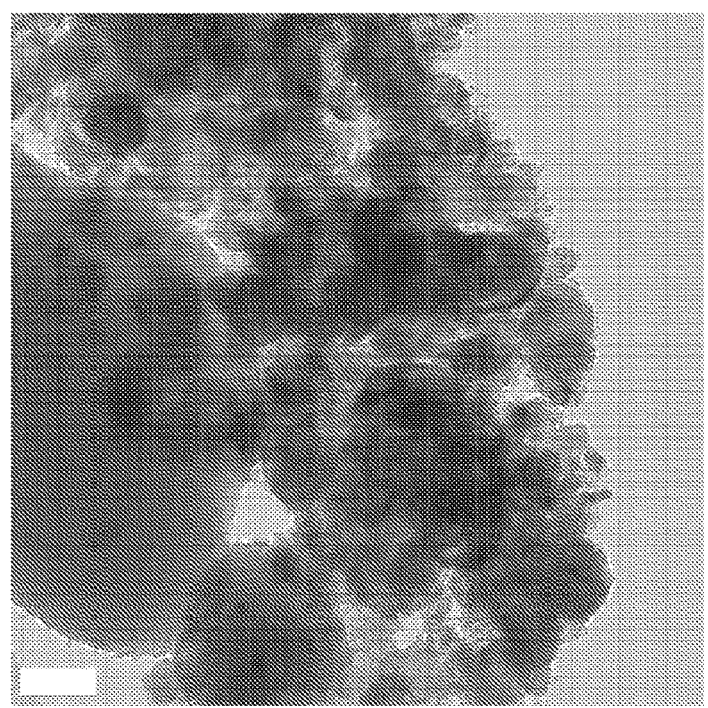
Figure 9F:
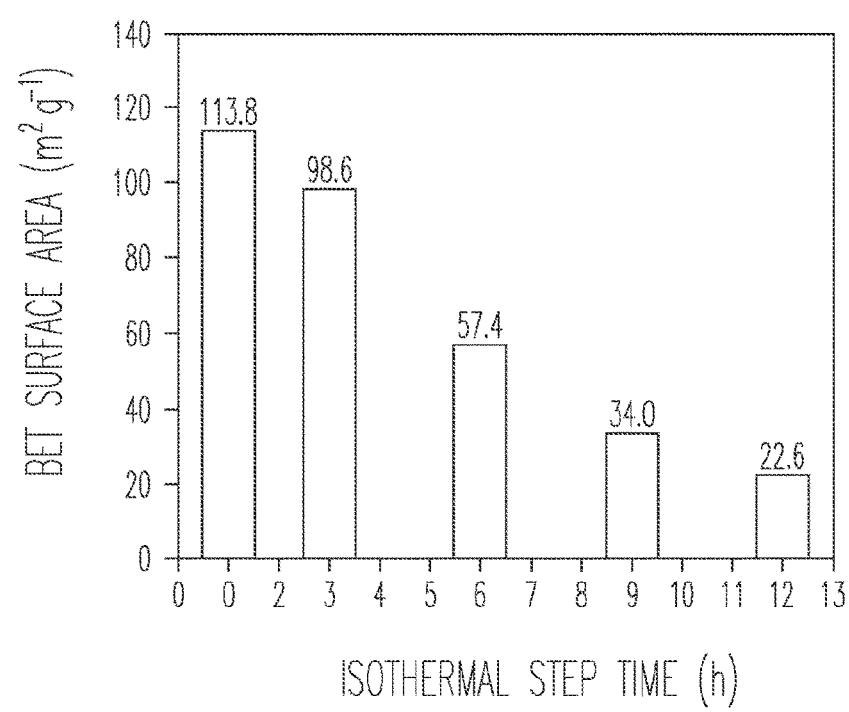
FIG. 9F shows an analysis of the surface area of the products of the magnesiothermic reaction.

After MRR, morphology and surface area changed significantly, clearly particle growth trend within isothermal time increment was observed by TEM, also a trend of porous structure evolution was observed, 1 h (FIG. 9A) and 3 h (FIG. 9B) has microporous architecture, 6 h (FIG. 9C) formed mesopores, 9 h (FIG. 9D) porous structure disappeared and 12 h (FIG. 9E) completely gone. 5-point method of surface area measurement was conducted for above materials (FIG. 9F). BET data shows clear downtrend of surface area which relates to the growth of Si crystal.

Figure 11A:
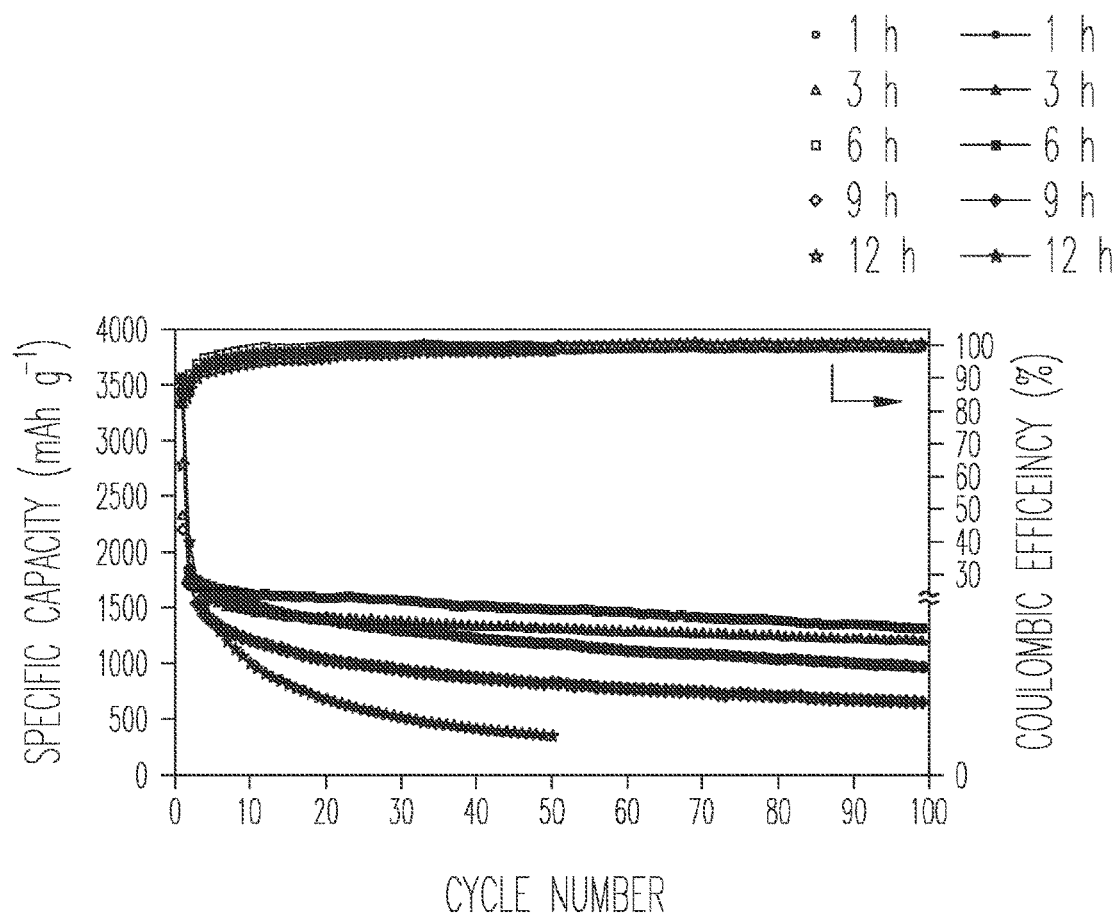
FIGS. 11A-11F show data on the cycle stability, delithiation/lithiation, and initial coulombic efficiency (ICE) of silicon and silicon-carbon composites.
Figure 11B:
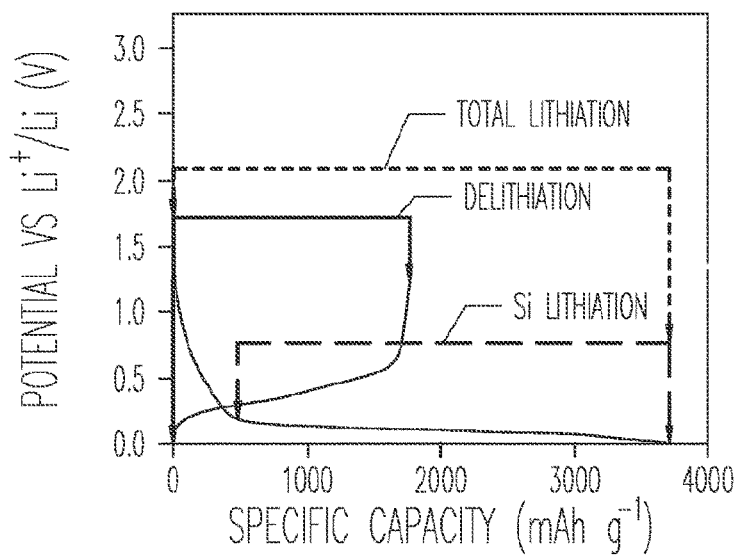
Figure 11C:
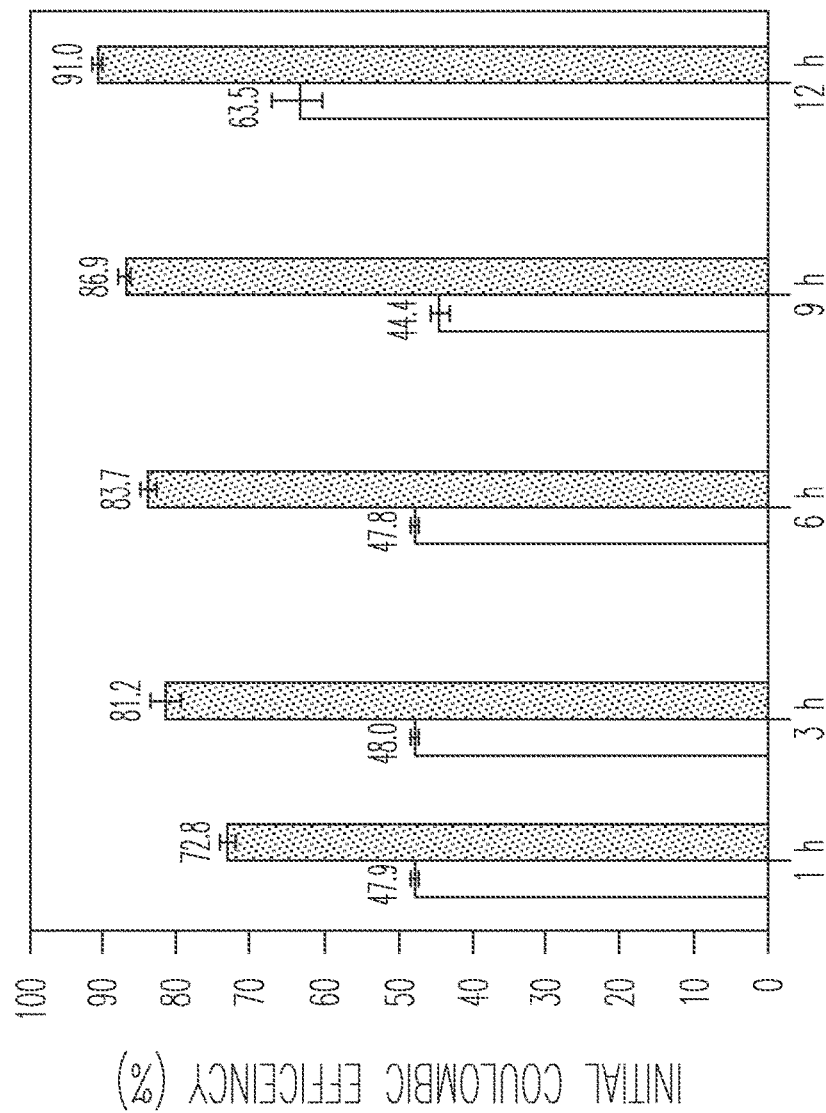

All above materials were made into coin cells for electrochemical testing. FIG. 11A shows the cycle stability and coulombic efficiency under charge and discharge rate of 100 mA/g, material which under condition of 6 h isothermal step time and 580 C has the highest capacity after 100 cycles as well as best cycle stability. In this case, the highest titillation capacity was 3562 mAh $g^{-1}$ with 48% reversibility. After 100 cycles, it achieves 74% capacity retention vs $2^{nd}$ cycle with 1344 mAh $g^{-1}$. 12 h material shows the worst cycle stability that might due to larger Si particle sire and less porosity. FIG. 119 shows the initial coulombic efficiency (ICE) of all above materials based on two different calculation methods. The first set of columns indicate reversibility (delithiation capacity/total lithiation capacity×100%) and the second set of columns are Si lithiation efficiency (Si lithiation capacity/total lithiation capacity×100%), terms explanation is shown in FIG. 11C. From the ICE, reversibility of 1 h, 3 h, 6 h, 9 h are all lower than 50% except 12 h which has around 61%. All the above materials can achieve ~80% Si lithiation capacity, there is 30% gap between these two calculation methods, which indicates that ~30% of Li was trapped and unable to be delithiated.

However, less than 50% of ICE would not meet practical application requirement. A carbon layer was deposited via CVD on the best performing spray-dried porous Si with varying carbon ratios. The capacity and cycle stability of the silicon article were improved. According to the ICE chart, reversibility of porous Si was significantly improved by 30%, the ICE is 82%, 76% and 76% with 9%, 12% and 16% carbon coating compared to 48% ICE of porous Si. Silicon lithiation efficiency had 5% improvement as well. Initial lithiation capacity dropped from 3562 mAh $g^{-1}$ of porous Si to 2951 mAh $g^{-1}$, 2690 mAh $g^{-1}$ and 2441 mAh $g^{-1}$ with 9%, 12% and 16% of carbon ratio. In this case, a Si—C composite with a 12% carbon ratio had the best performance, which achieved 2690 mAh $g^{-1}$ initial capacity and 76% ICE. After 100 cycles, it still had 1720 mAh $g^{-1}$, which maintained 83% capacity compared to the second cycle. For $Si—C_{9wt\%}$ and $Si—C_{16wt\%}$, the capacity remained is 1642 mAh $g^{-1}$ and 1476 mAh $g^{-1}$, and capacity retention after 100 cycles is 74% and 79% vs $2^{nd}$ cycle.

Figure 14A:
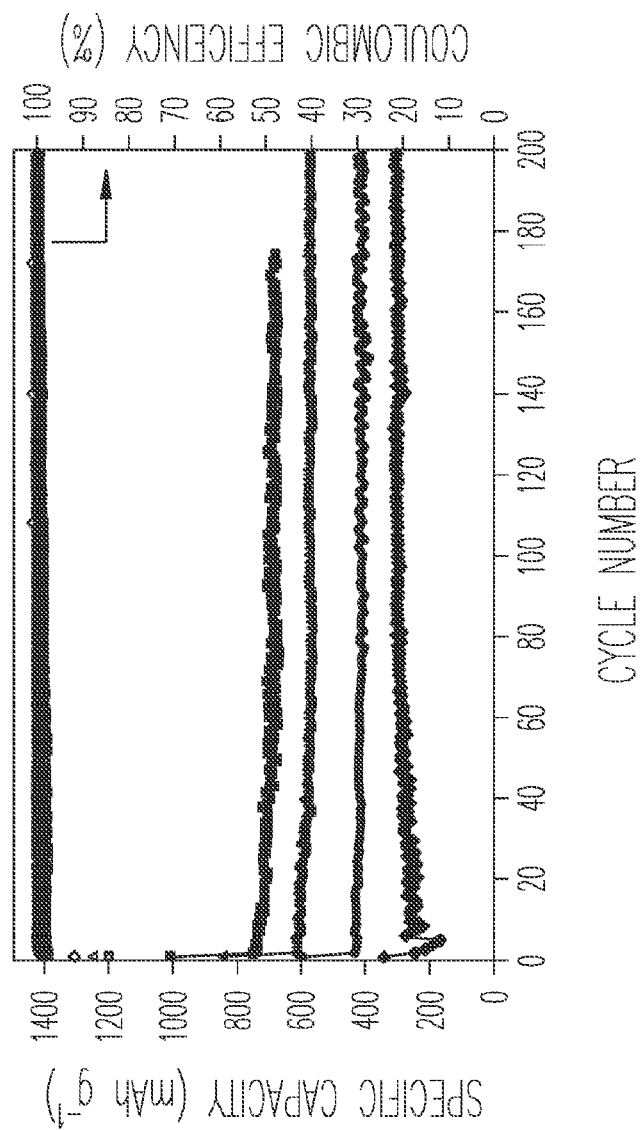
FIGS. 14A-14D show cycle stability of silicon-carbon-graphite hybrid anodes.
Figure 14B:
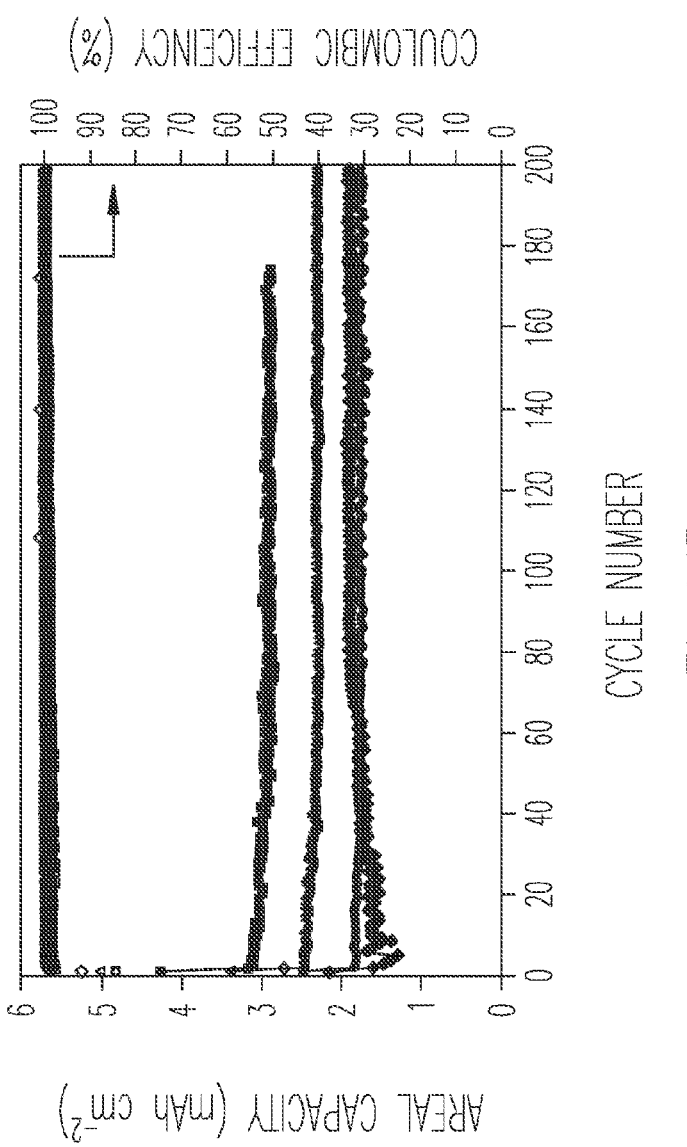
Figure 14C:
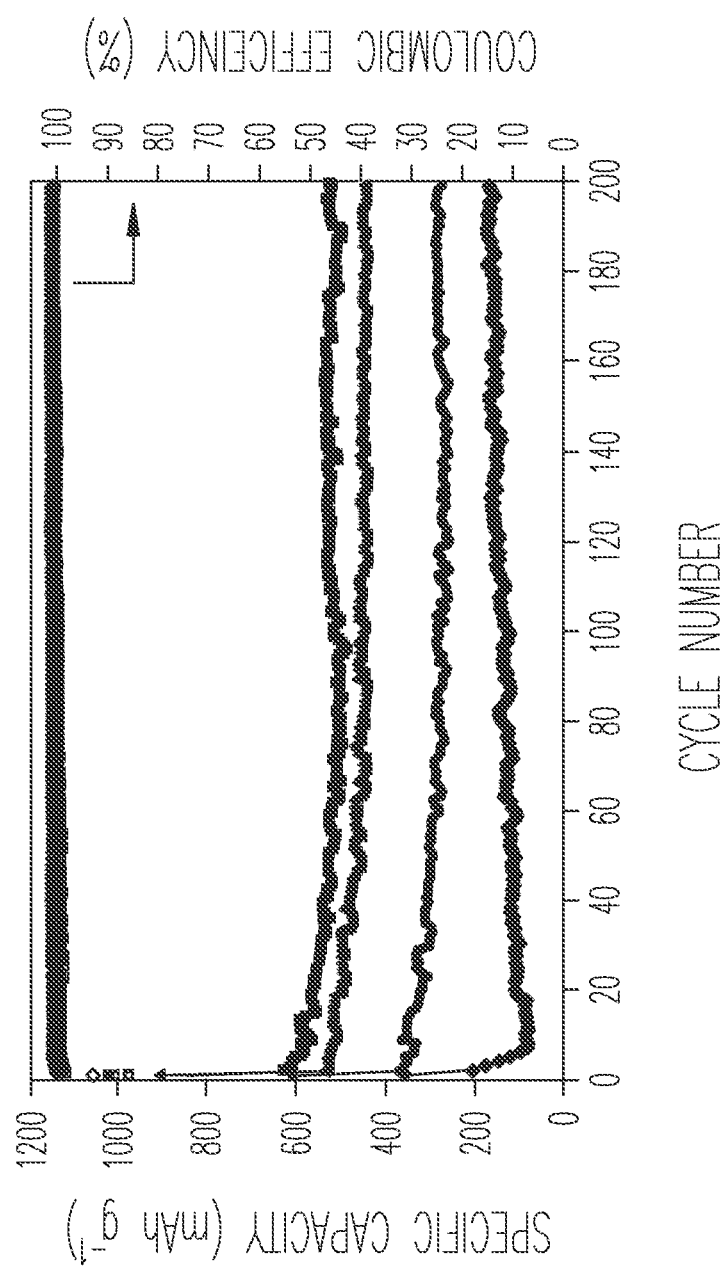
Figure 14D:
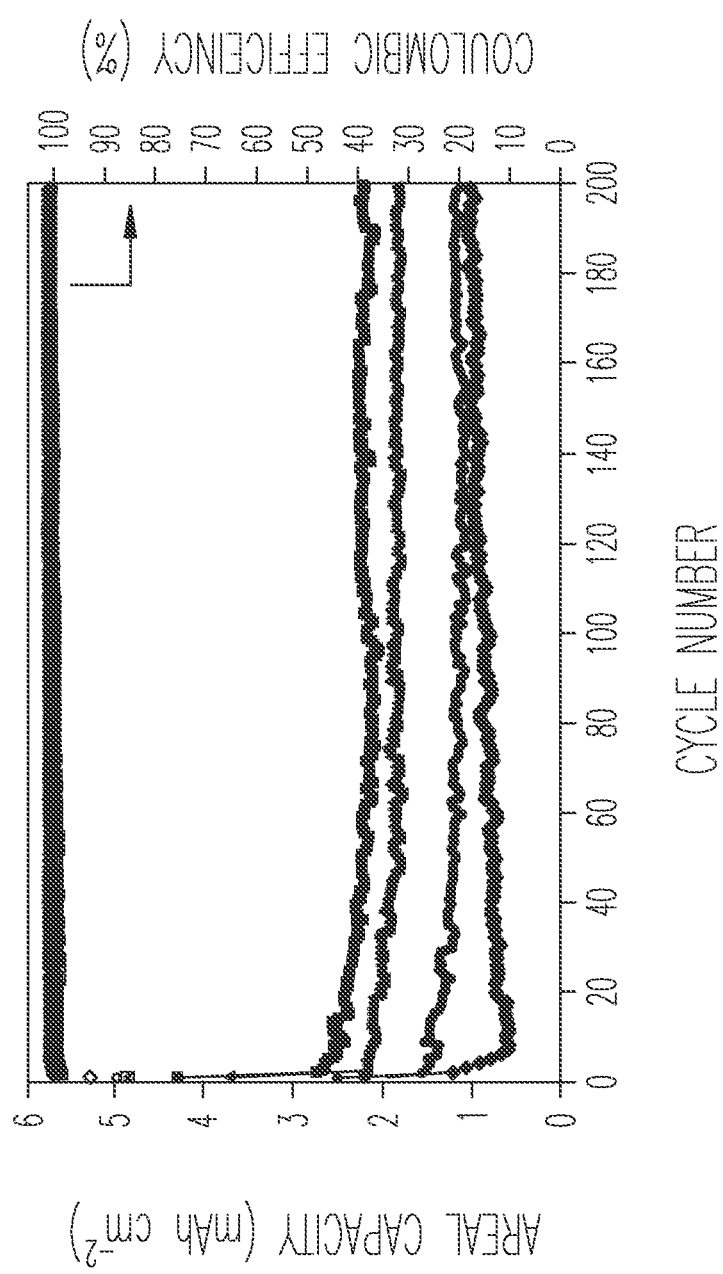

One of the most practical applications of Si—C is for use as an add-in material for graphite anodes to enhance capacity. $Si—C12_{wt\%}$ was employed as additive and evaluated in an electrode of Si—C and commercial graphite, 4 wt. % of carboxymethyl cellulose binder, 1 wt. % of styrene-batadiene rubber and 5 wt. % of acetylene black. Si—C weight ratio was 10%, 20% and 30% and corresponding graphite was 80%, 70% and 60%. Electrode areal mass loading is around 4 mg $cm^{-2}$, and commercial graphite anode (areal loading 6.4 mg $cm^{-2}$) purchased from MTI were used as a reference. The anodes were made into coin cells and electrochemical tests were performed. FIGS. 14A-14D show the cycle stability and coulombic efficiency under charge and discharge rate of 0.5 mA $cm^{-2}$. FIG. 14A evaluates performance in terms of specific capacity of Si—C/graphite hybrid anode and FIG. 14B is in terms of areal capacity. FIGS. 14C and 14D show the performance under 1 mA $cm^{-2}$ current density.

With the aid of the Si—C composite, anode performance was boosted. The initial specific capacity of 10 wt. % (4.2 mg $cm^{-2}$), 20 wt. % (4.0 mg $cm^{-2}$) and 30 wt. % (4.2 mg $cm^{-2}$) Si—C/graphite hybrid under 0.5 mA $cm^{-2}$ were 601 mAh $g^{-1}$, 848 mAh $g^{-1}$ and 1015 mAh $g^{-1}$ compared to commercial graphite anode (6.4 mg $cm^{-2}$) 347 mAh $g^{-1}$, areal capacity were 2.5 mAh $cm^{-2}$, 3.4 mAh $cm^{-2}$ and 4.3 mAh $cm^{-2}$ respectively vs 2.2 mAh $cm^{-2}$ of graphite. ICE was slightly improved from 76% of $Si—C12_{wt\%}$ to 88% (10 wt. % Si—C), 85% (20 wt. % Si—C) and 84% (30 wt. % Si—C), corresponding capacities after 200 cycles were 416 mAh $g^{-1}$, 574 mAh $g^{-1}$ and 690 mAh $g^{-1}$ ($174^{th}$ cycle) and capacity retention vs $2^{nd}$ cycle were 95%, 92% and 91% ($174^{th}$ cycle). Under 1 mA $cm^{-2}$ current density, 10 wt. % (4.1 mg $cm^{-2}$), 20 wt. % (4.1 mg $cm^{-2}$) and 30 wt. % (4.2 mg $cm^{-2}$) Si—C/graphite hybrid still achieved 368 mAh $g^{-1}$, 526 mAh $g^{-1}$ and 626 mAh $g^{-1}$ at $2^{nd}$ cycle. And during the 200 cycles these three types of anode hold areal capacity of 1.2 mAh $cm^{-2}$, 1.8 mAh $cm^{-2}$, 2.2 mAh $cm^{-2}$. However commercial graphite anode capacity fade and only had less than 1 mAh $cm^{-2}$ of areal capacity, that might due to the intrinsic inferior rate capability of graphite.

Figure 15A:
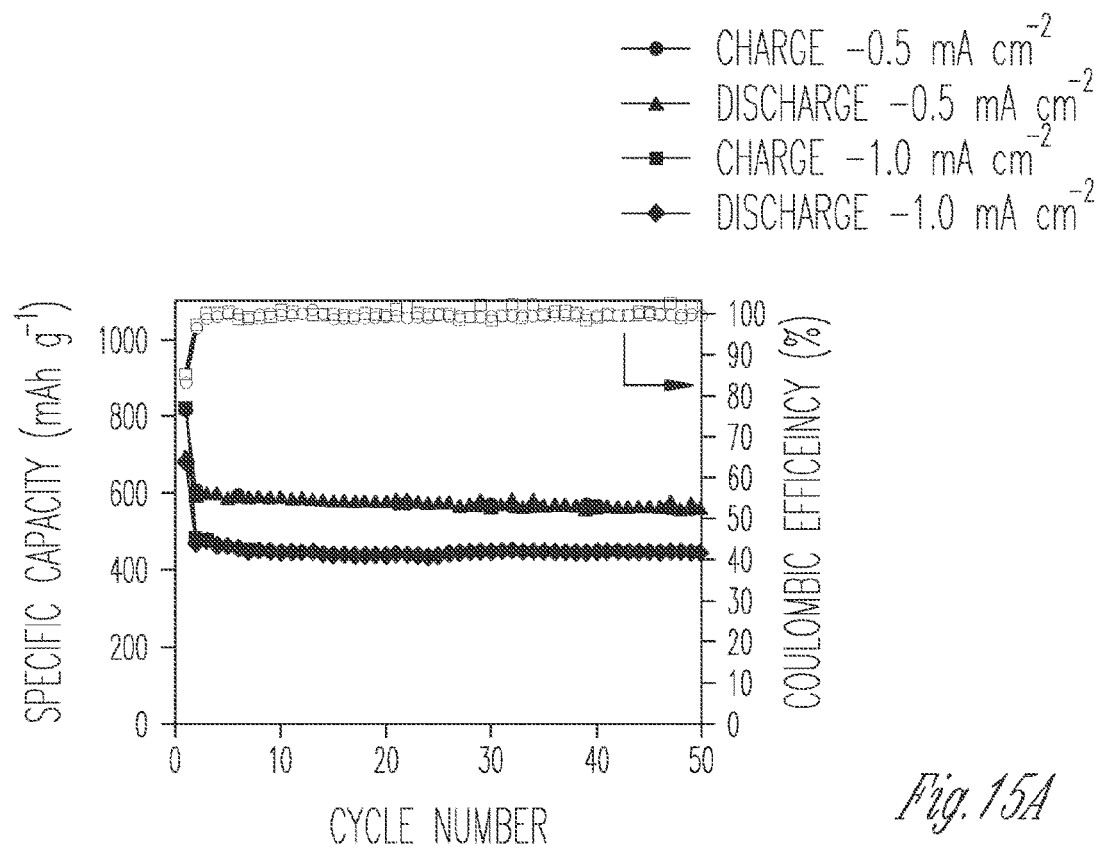
FIG. 15A shows cycle stability of silicon-carbon-graphite anodes.
Figure 15B:
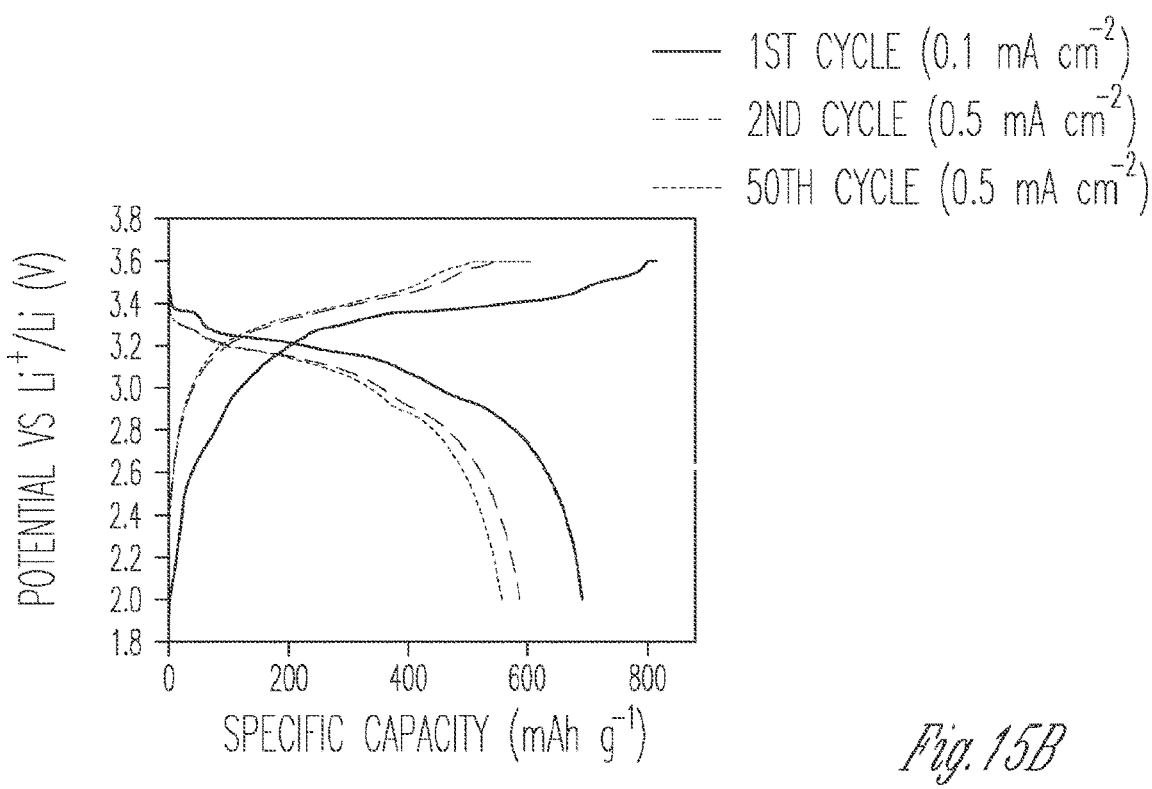
FIGS. 15B-15C show representative charge and discharge voltage profiles for silicon-carbon-graphite anodes.
Figure 15C:
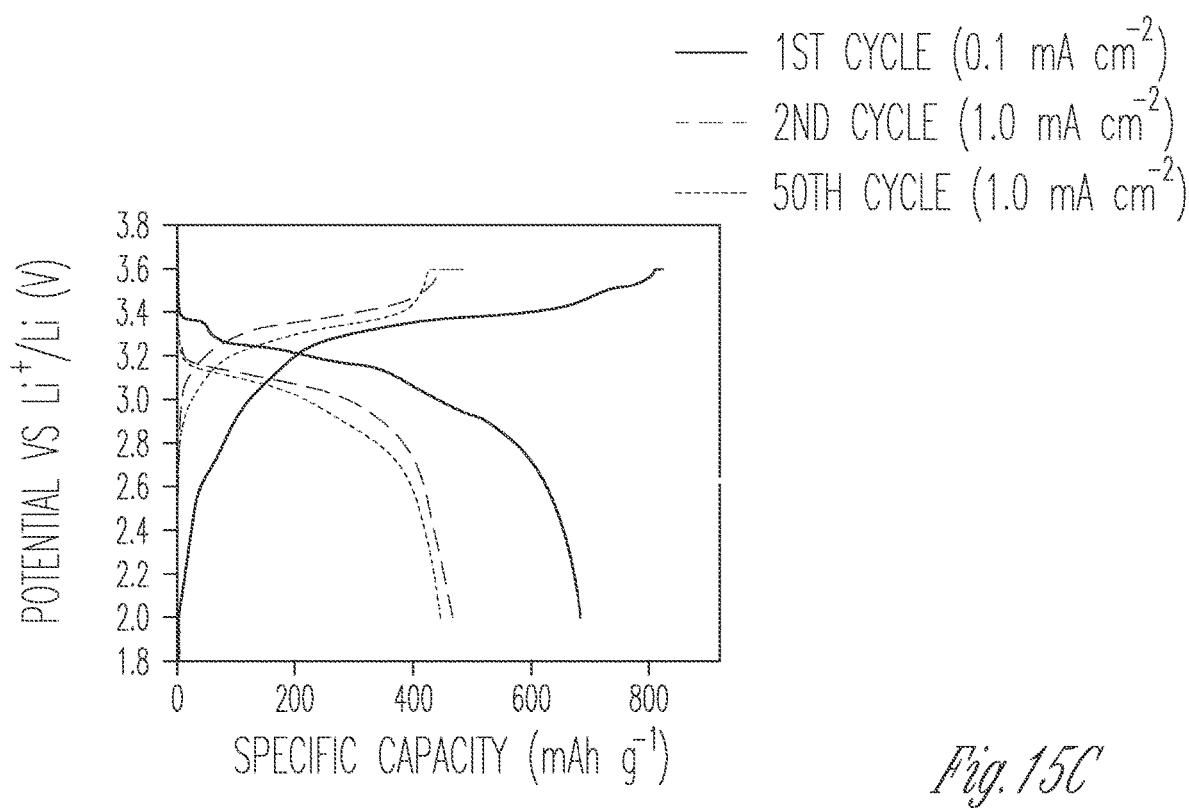

Si—C/graphite anodes paired with $LiFePO_4$ cathodes as full cells were assembled, the charge and discharge rate of $1^{st}$ cycle was 0.1 mA $cm^{-2}$. Subsequently, then 0.5 mA $cm^{-2}$ or 1 mA $cm^{-2}$ were applied for rest cycles. Charge used constant current constant voltage method with cut off current 50 mA $cm^{-2}$. FIGS. 15A-15C shows the cycle stability and coulombic efficiency of the full under 0.5 mA $cm^{-2}$ and 1 mA $cm^{-2}$, compared to commercial graphite anode paired with $LiFePO_4$ cathode full cell, the unambiguously specific capacity improvement was demonstrated. At first 0.5 mA $cm^{-2}$ current applied cycle, Si—C/graphite anode achieve 605 mAh $g^{-1}$ or 2.4 mAh $cm^{-2}$ with 20 wt. % Si—C. ICE is 85% correspondingly. Under 1 mA $cm^{-2}$, Si—C/graphite anode still extended a good rate capability and achieve 1.9 mAh $cm^{-2}$ areal capacity with 20 wt. % Si—C. FIG. 15B shows an excellent capacity retention and proved by the stable charge and discharge voltage profile at various cycles.

In summary, we demonstrated a cost-effective and highly scalable synthesis route to produces Si and Si—C composites. We investigated the phenomenon of magnesiothermic reduction reaction. And performed kinetics study and obtained reaction constant. We succeeded in controlling Si nanoparticles size growth and preservation of porous architecture as secondary structure. With promising electrochemical performance, simple, controllable, low-temperature and low-cost synthesis process, our Si—C composite is promising for next-generation Li-ion batteries anode.

Figure 1B:
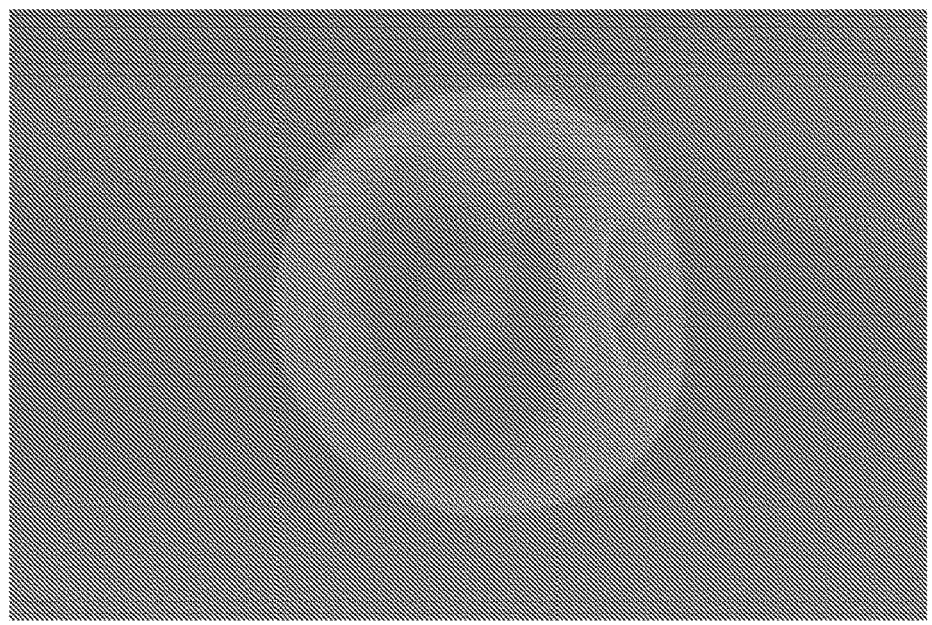
Figure 1C:
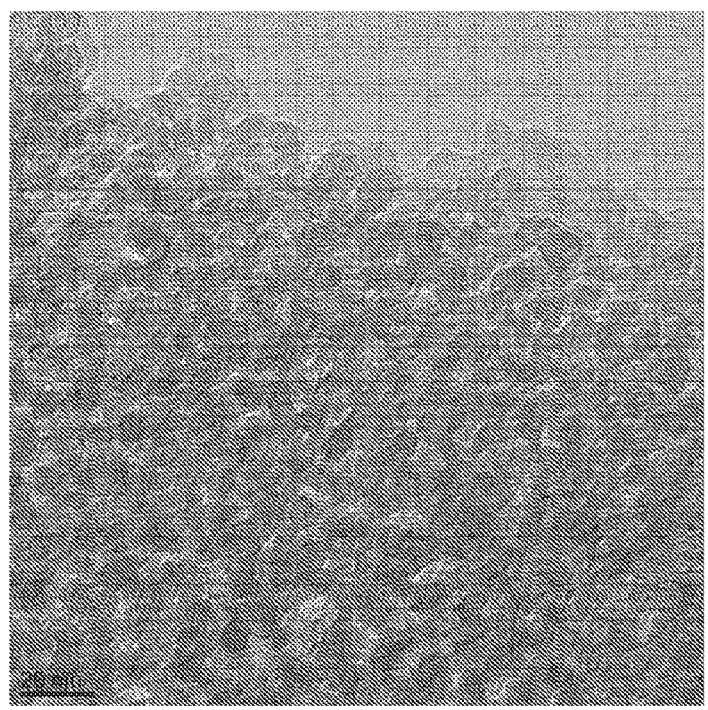
Figure 1D:
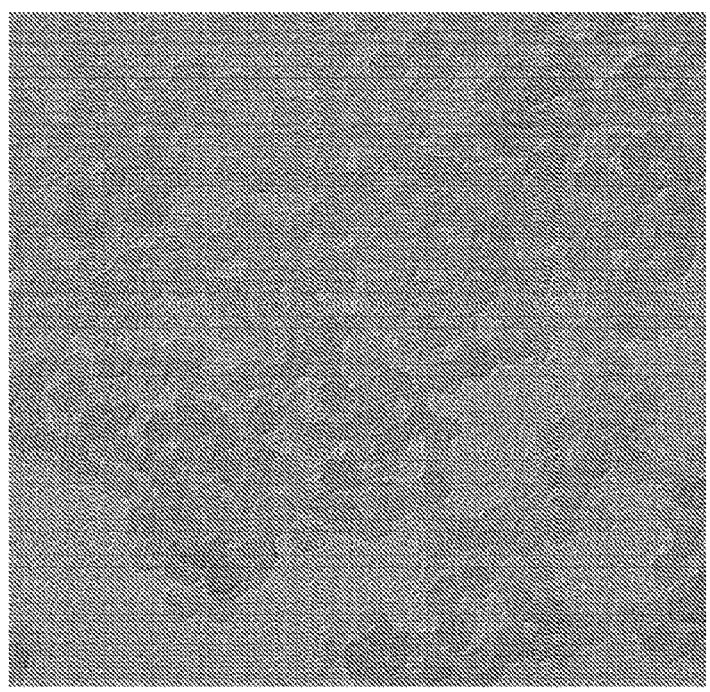
Figure 2A:
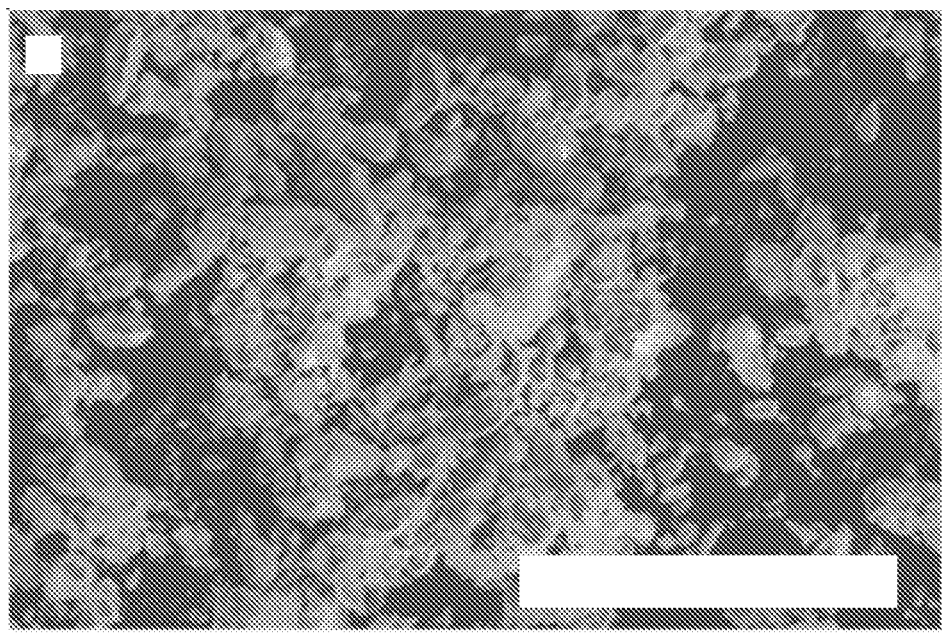
FIGS. 2A-2F are SEM images of silicon oxide nanoparticles mixed with magnesium powder for the magnesiothermic reaction.
Figure 2B:
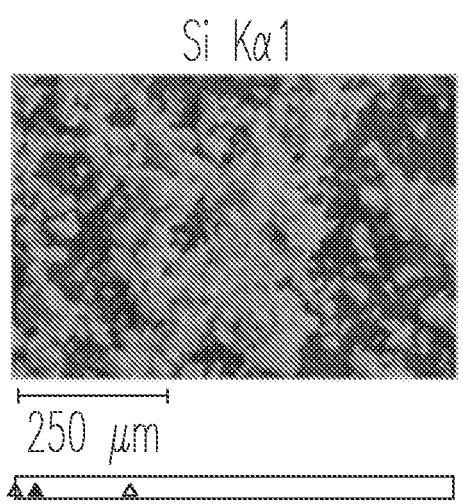
Figure 2C:
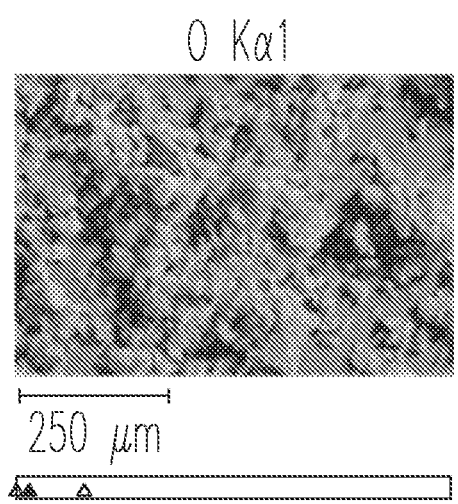
Figure 2D:
Figure 2E:
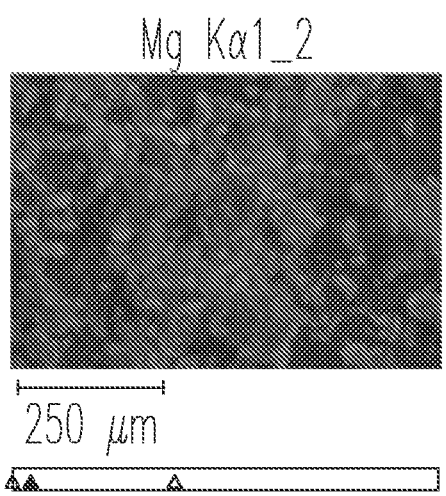
Figure 2F:
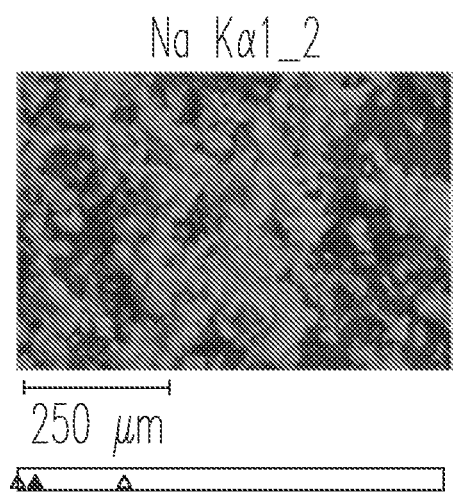

FIG. 1A is a scanning electron microscopy (SEM) image of silicon oxide nanoparticles at low magnification. FIGS. 1B-1C are transmission electron microscopy (TEM) images of silicon oxide nanoparticles at high magnification. FIG. 1D is a TEM image of silicon oxide nanoparticles.

FIGS. 2A-2F are SEM images of silicon oxide nanoparticles mixed with magnesium powder for the magnesiothermic reaction with energy dispersive x-ray spectroscopy (EDX) mapping.

FIG. 3A shows x-ray crystallography (XRD) data for silicon oxide nanoparticles mixed with magnesium powder for the magnesiothermic reaction at 580 degrees Celsius for 0 hours.

FIG. 3B shows kinetics conversion predictions calculated from obtained rate constants for the isothermal step of the magnesiothermic reaction of silicon oxide nanoparticles.

Figure 4A:
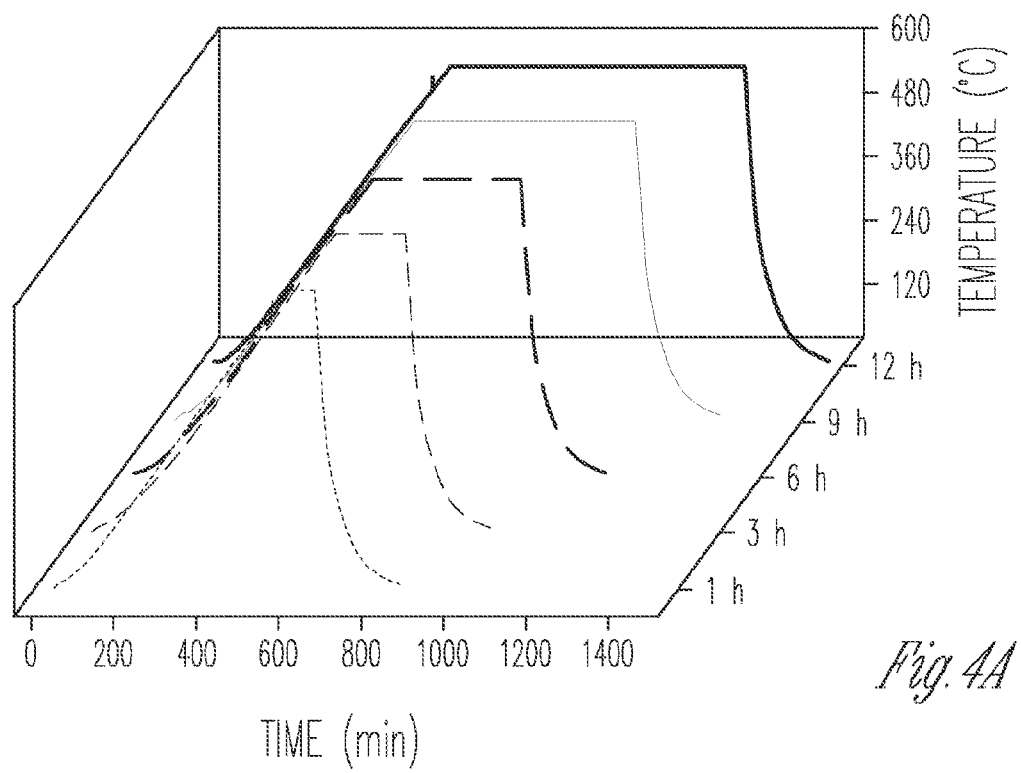
FIGS. 4A-4D show the isothermal temperature profile of the magnesiothermic reaction.
Figure 4B:
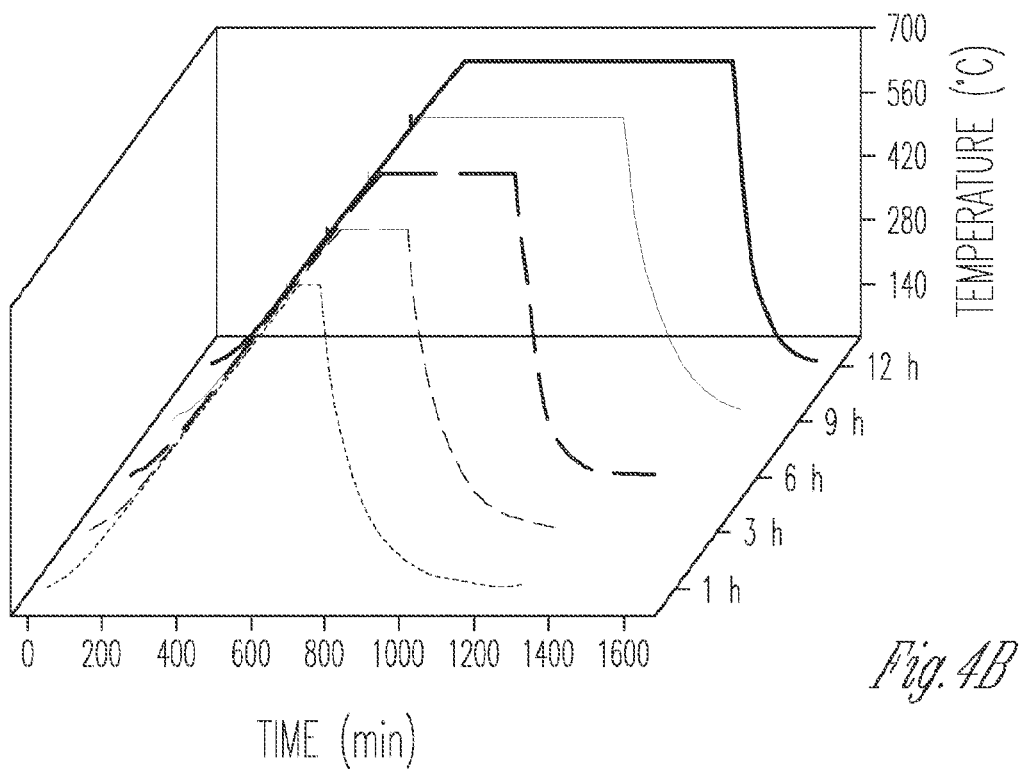
Figure 4C:
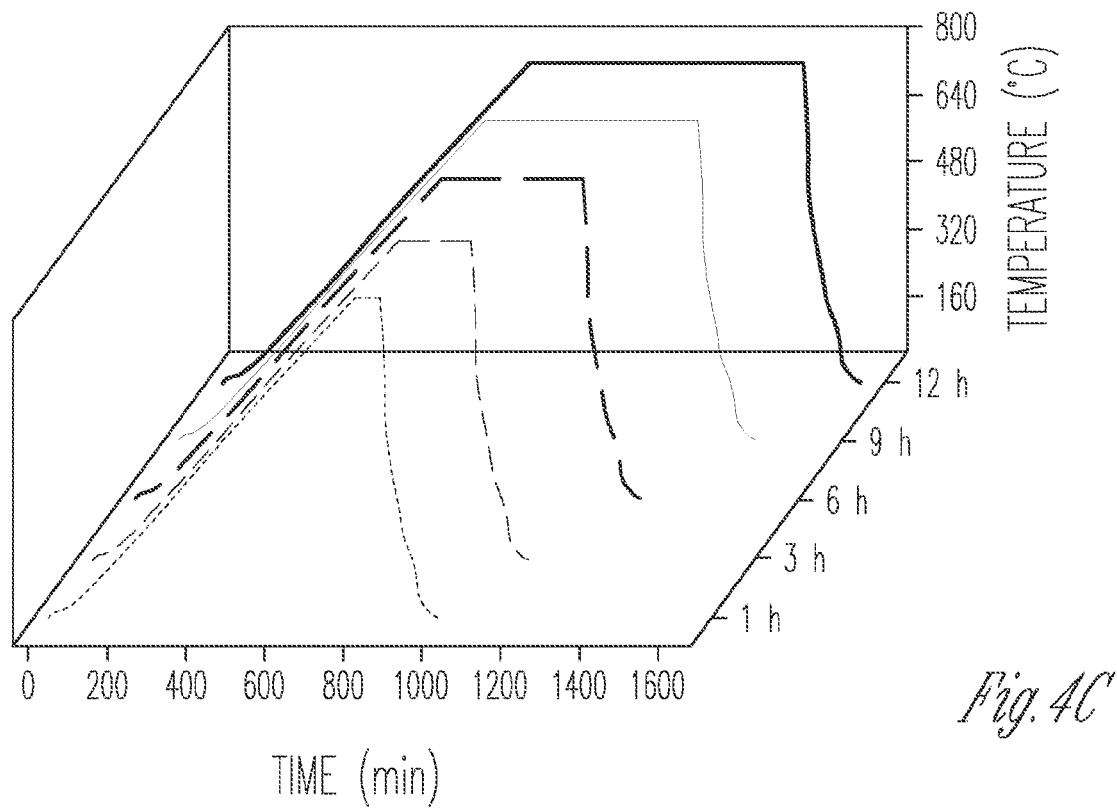
Figure 4D:
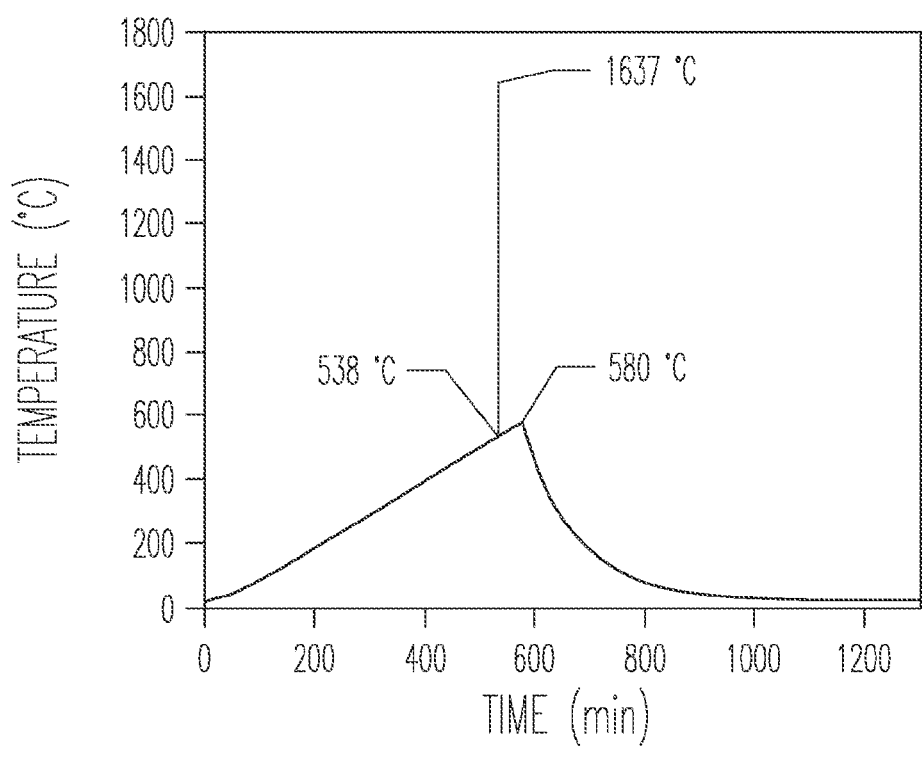
Figure 4E:
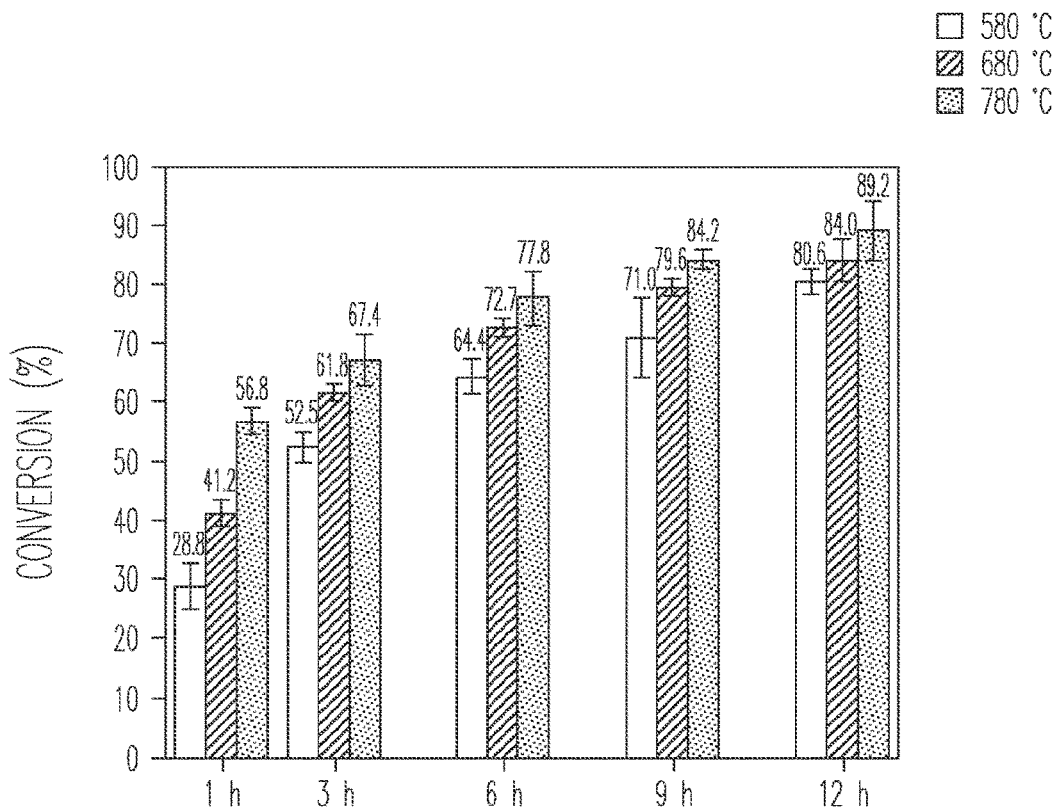
FIG. 4E shows conversions of the isothermal temperature profiles of FIGS. 4A-4D.

FIGS. 4A-4D show the isothermal temperature profile of the magnesiothermic reaction. FIG. 4A shows the isothermal temperature profile of 600° C. with NaCl under 1 h, 3 h, 6 h, 9 h and 12 h. FIG. 4B shows the isothermal temperature profile of 700° C. with NaCl under 1 h, 3 h, 6 h, 9 h and 12 h. FIG. 4C shows the isothermal temperature profile of 800° C. with NaCl under 1 h, 3 h, 6 h, 9 h and 12 h. FIG. 4D shows the isothermal temperature profile of 600° C. without NaCl under 0 h.

FIG. 4E shows conversions (averages of three of the above conditions) of the isothermal temperature profiles of FIGS. 4A-4D.

Figure 4F:
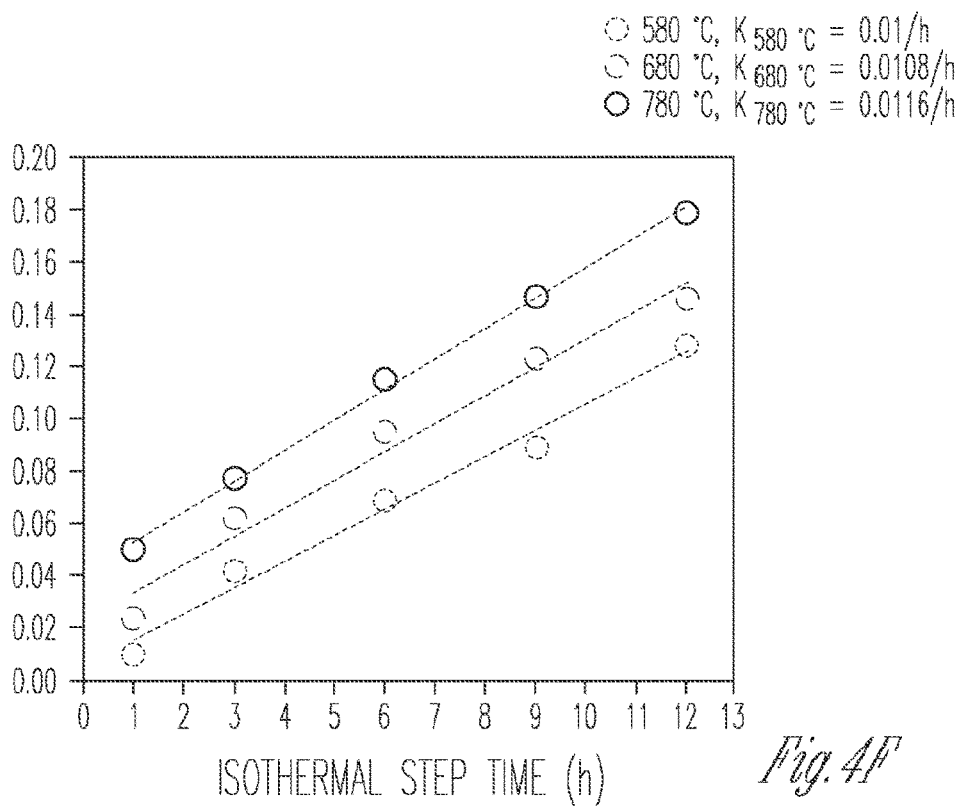
FIG. 4F shows the Ginstling-Brounshtein model fitting of FIG. 4E.

FIG. 4F shows the Ginstling-Brounshtein model fitting of conversion of FIG. 4E.

Figure 5A:
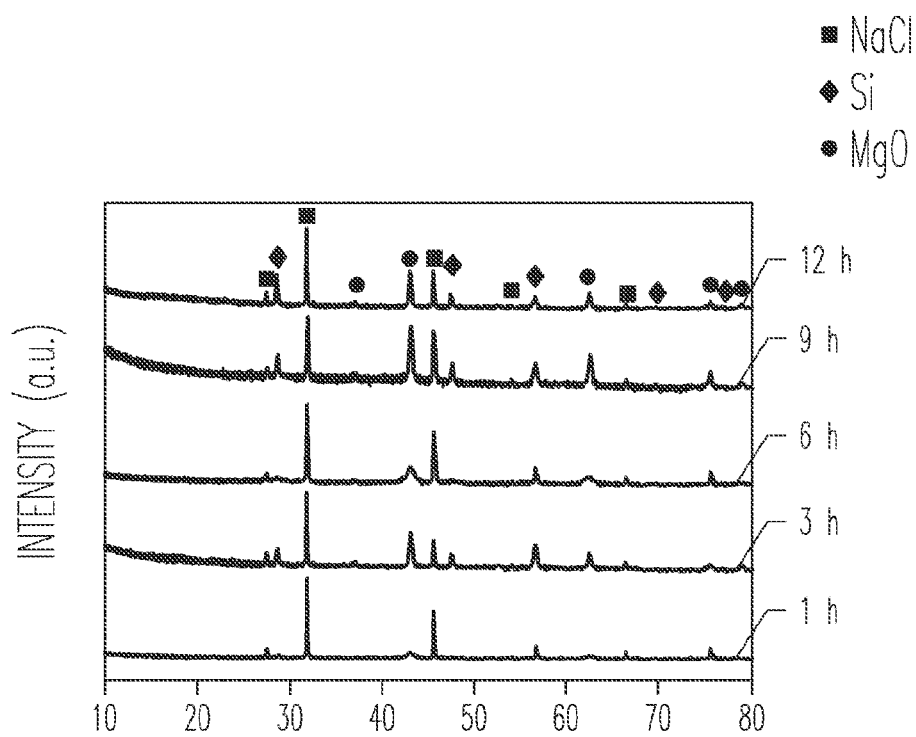
FIGS. 5A-5B show XRD data for products of the magnesiothermic reaction.
Figure 5B:
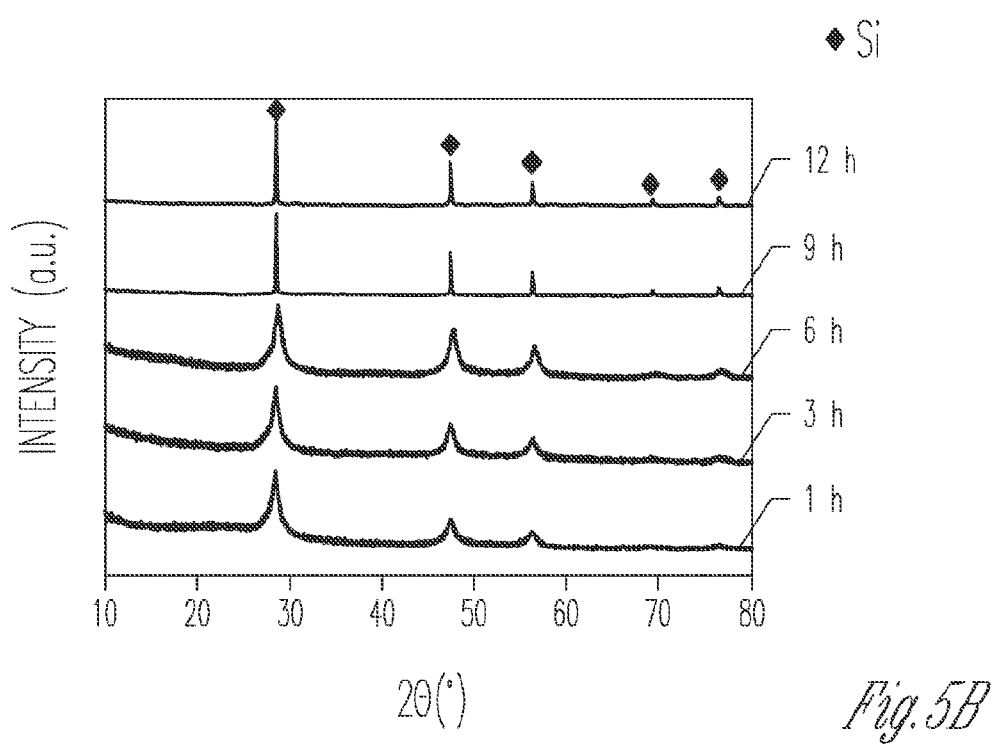
Figure 6A:
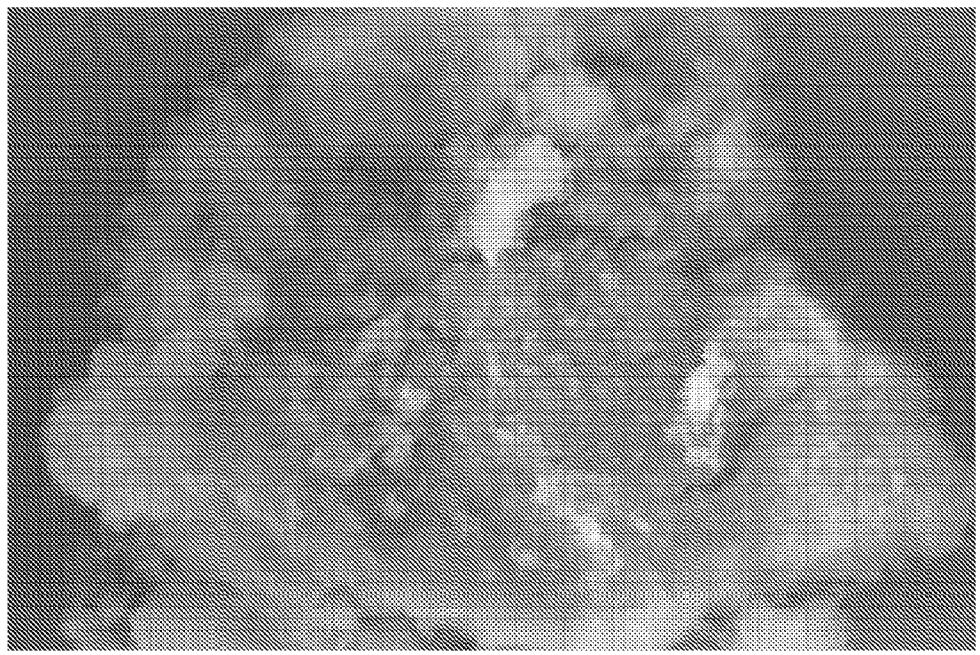
FIGS. 6A-6E are SEM images of products of the magnesiothermic reaction.
Figure 6B:
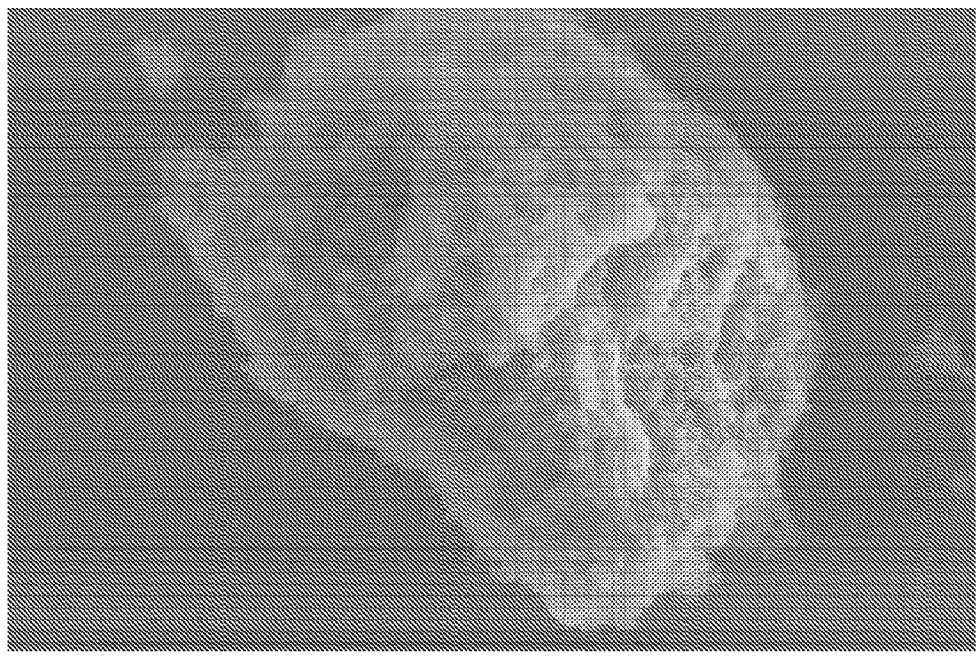
Figure 6C:
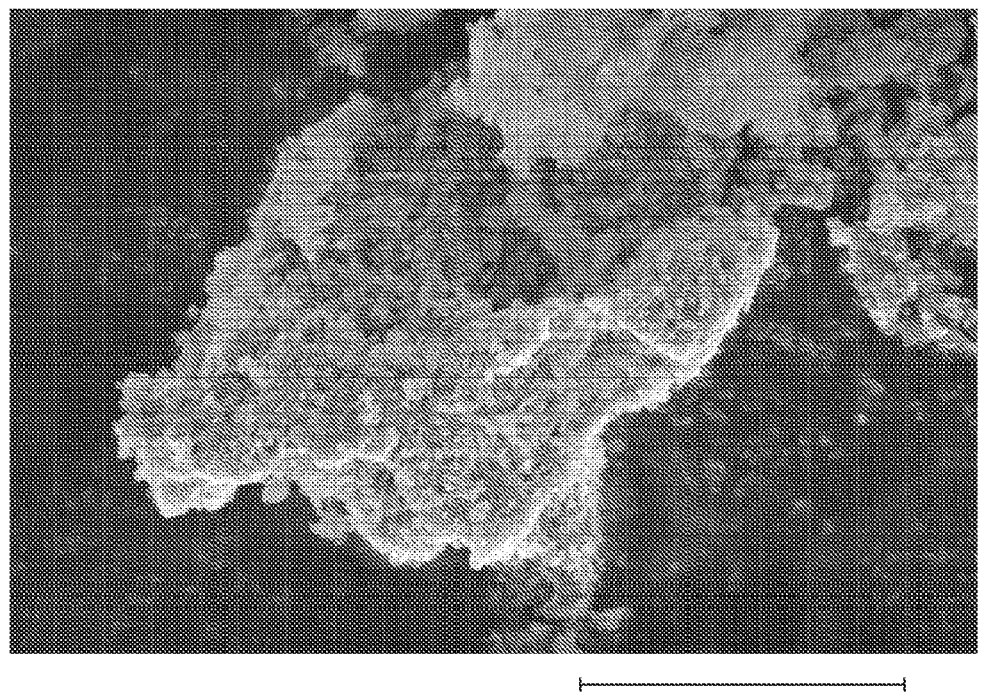
Figure 6D:
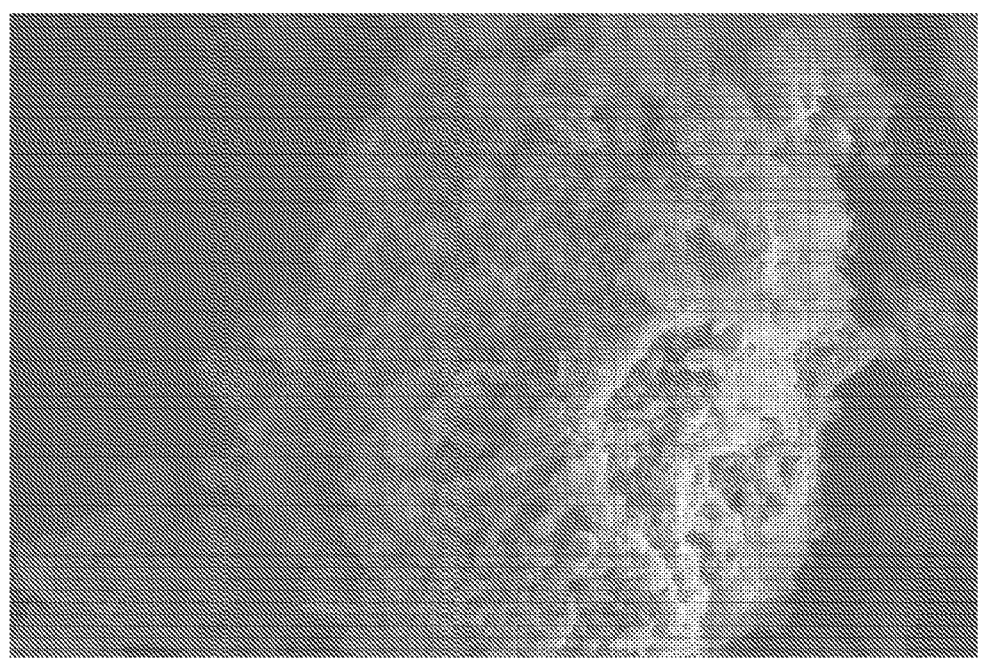
Figure 6E:
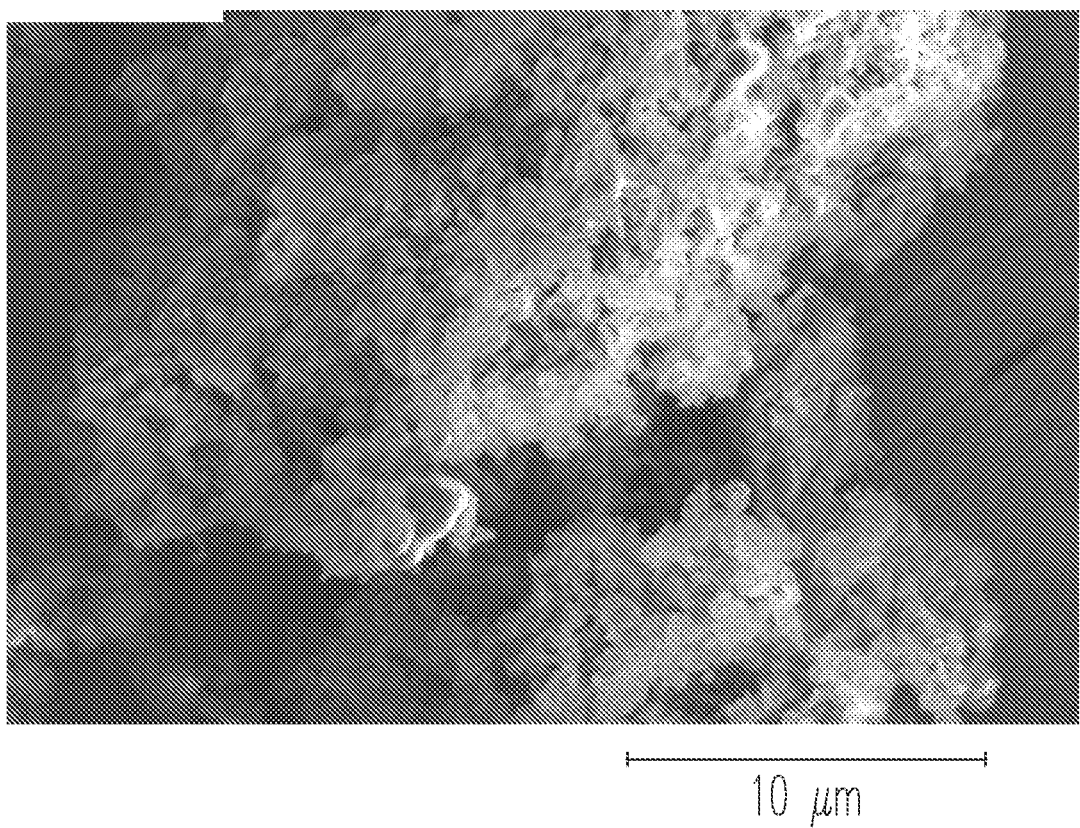
Figure 7A:
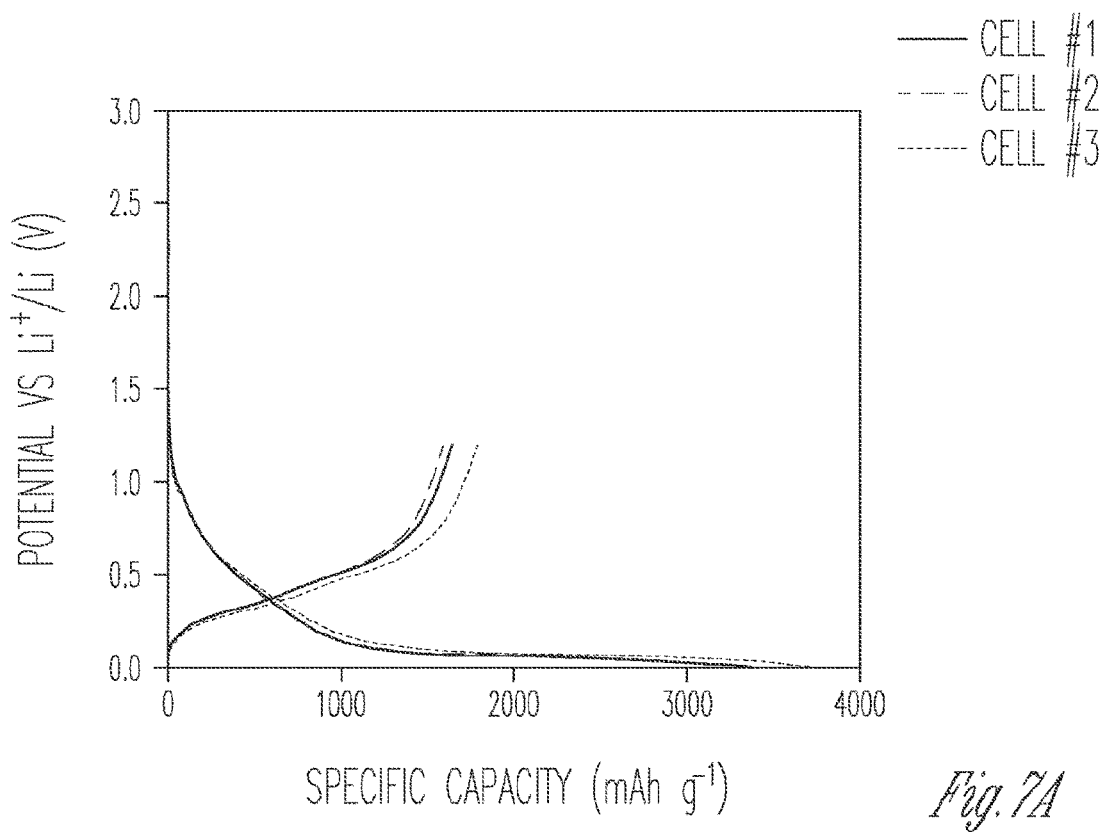
FIGS. 7A-7E are lithiation-delithiation curves of products of the magnesiothermic reaction.
Figure 7B:
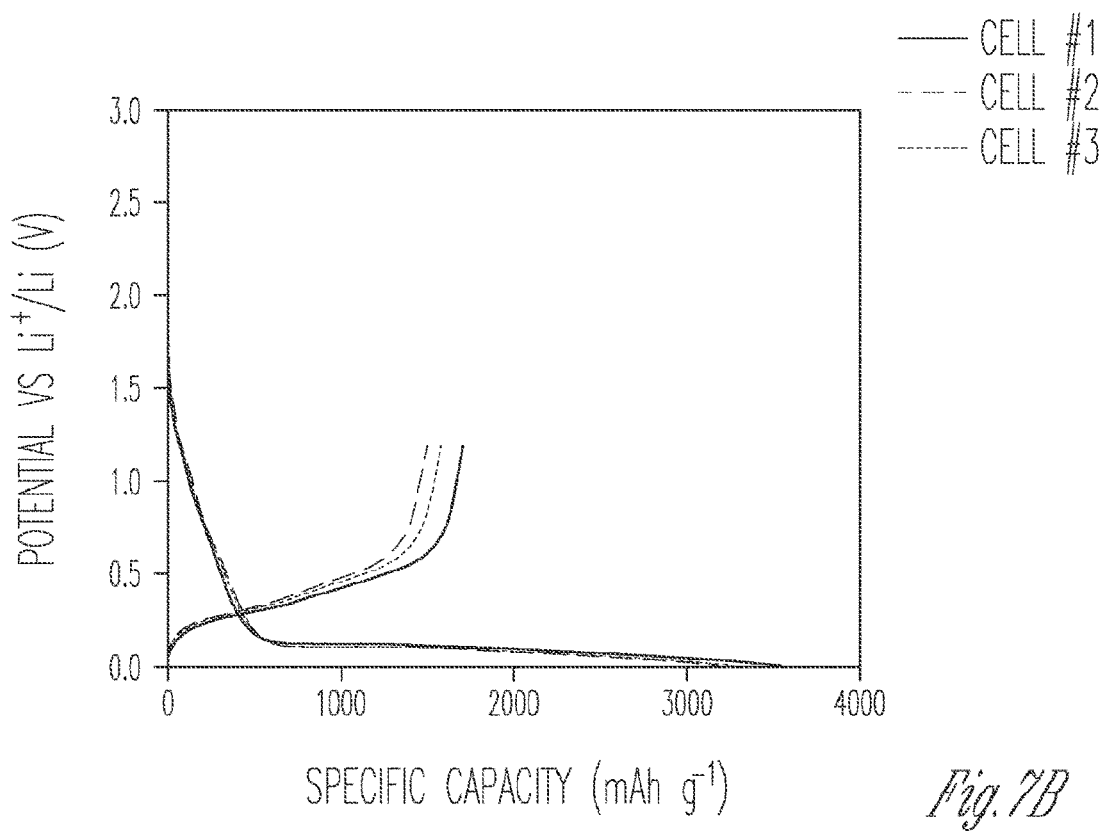
Figure 7C:
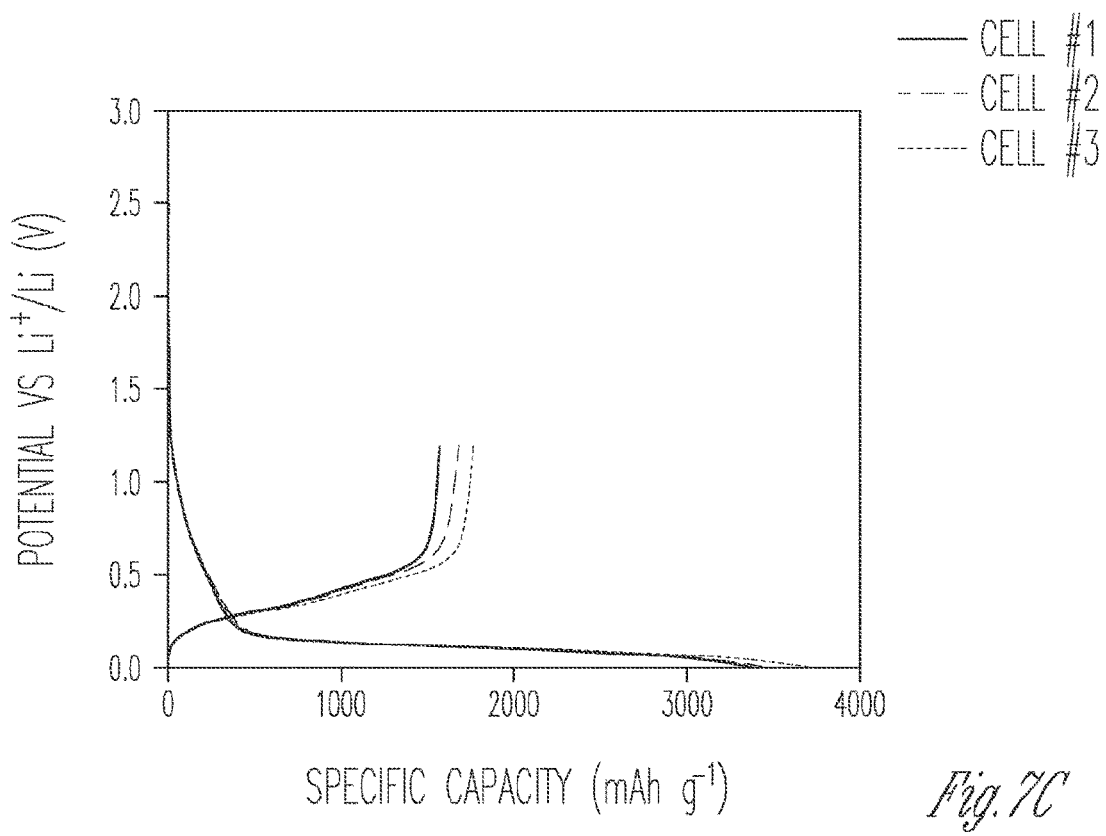
Figure 7D:
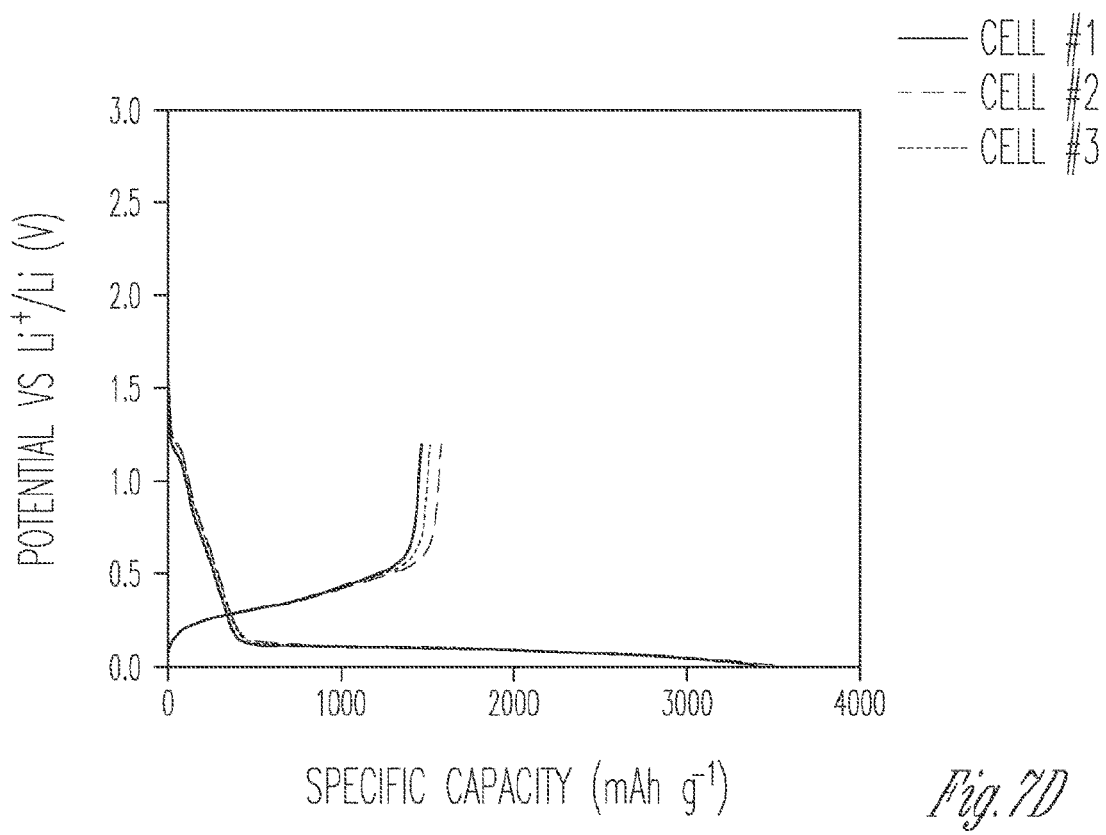
Figure 7E:
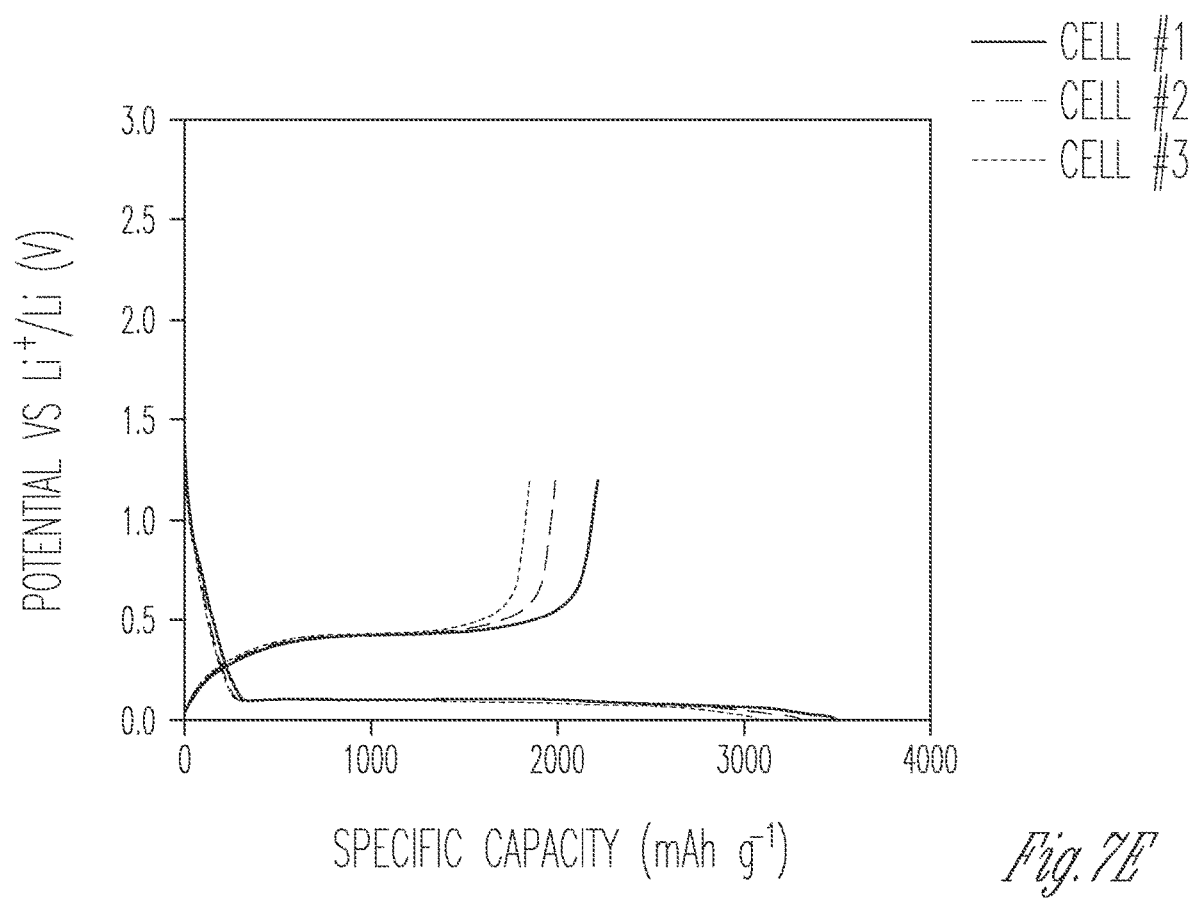
Figure 8A:
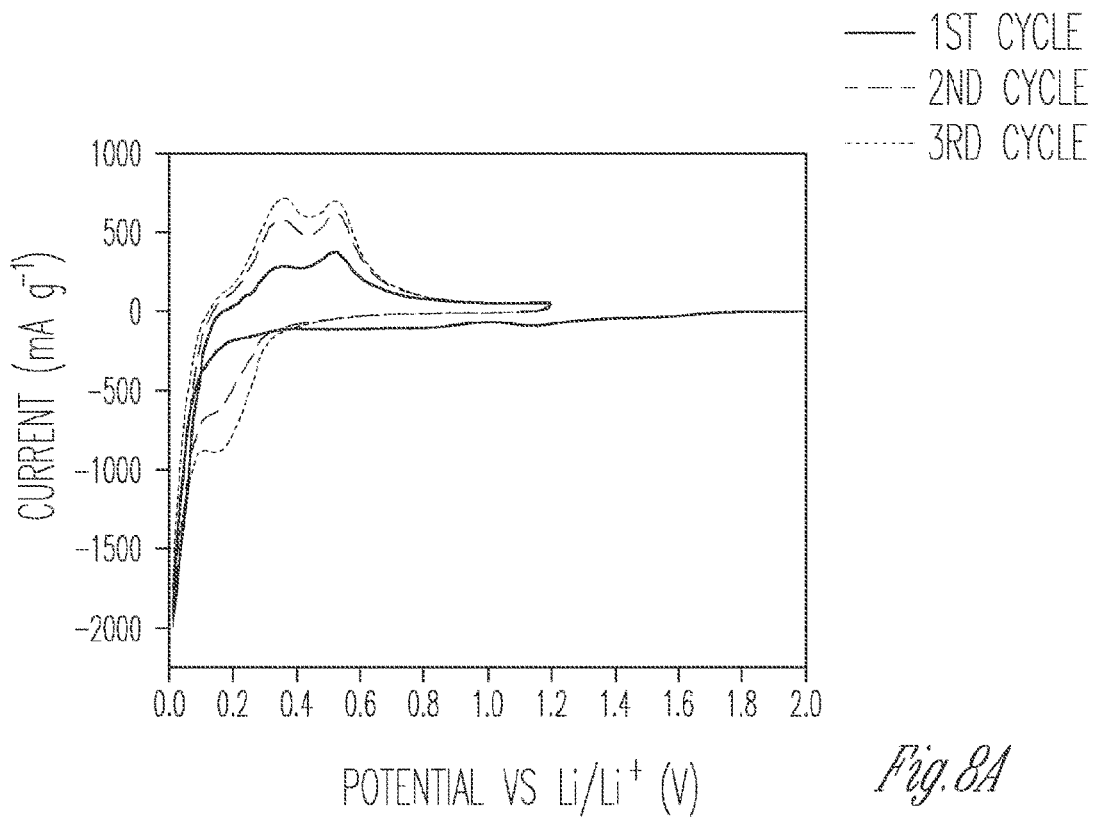
FIGS. 8A-8E show capacitance-voltage curves of product of the magnesiothermic reaction.
Figure 8B:
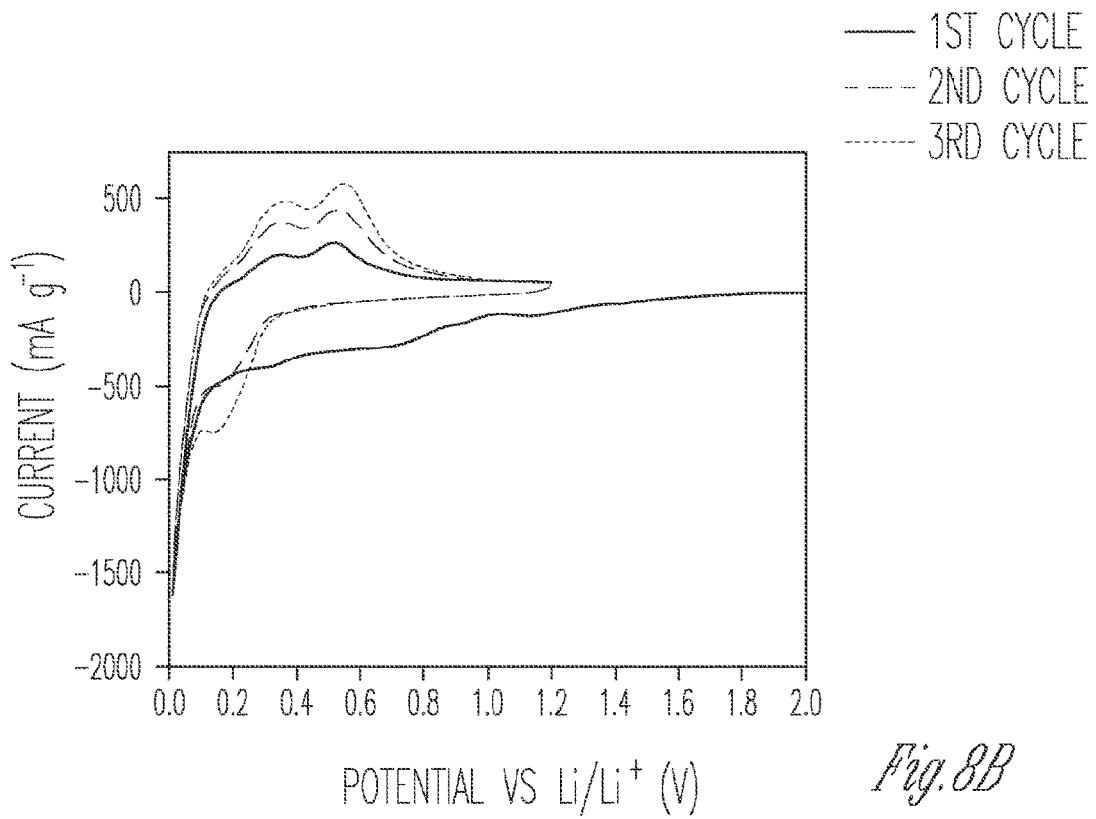
Figure 8C:
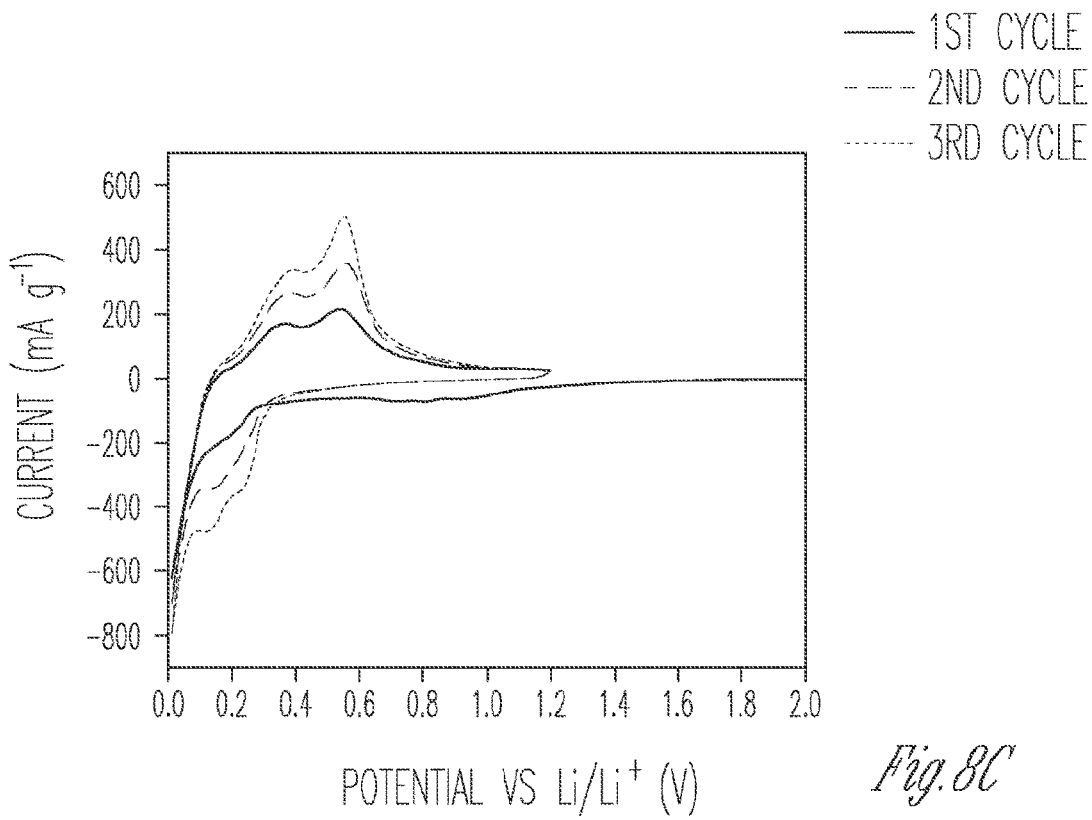
Figure 8D:
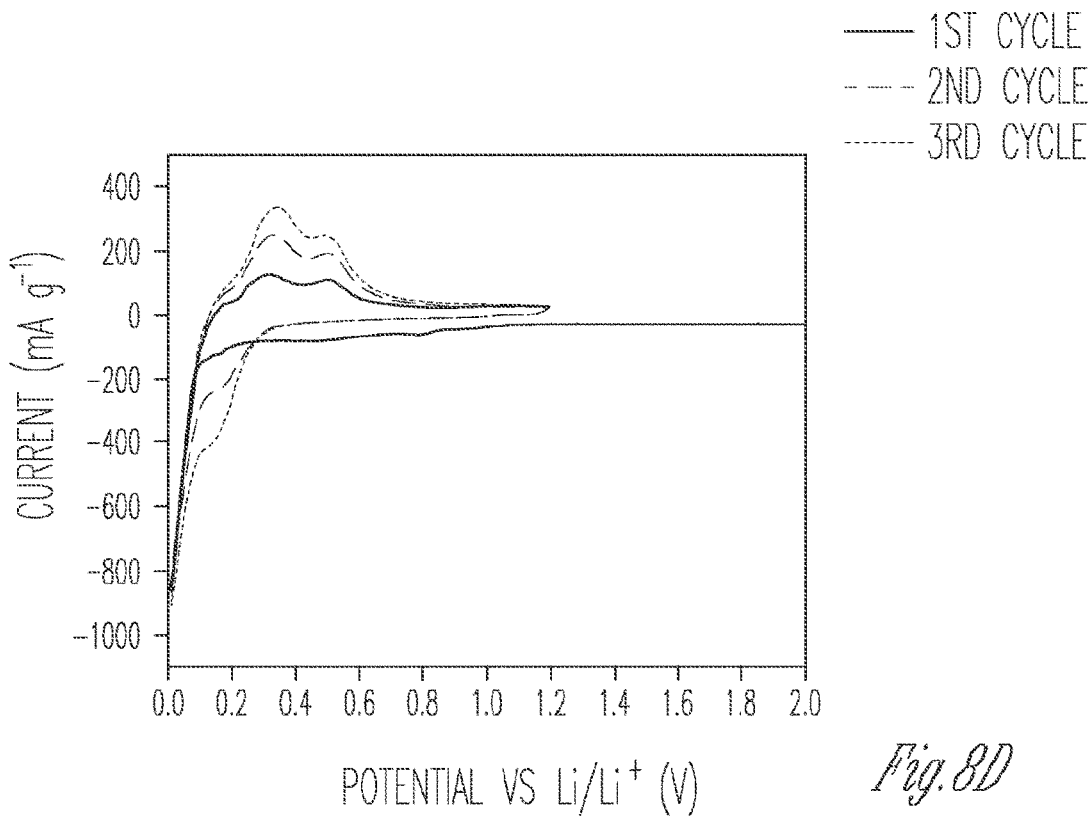
Figure 8E:
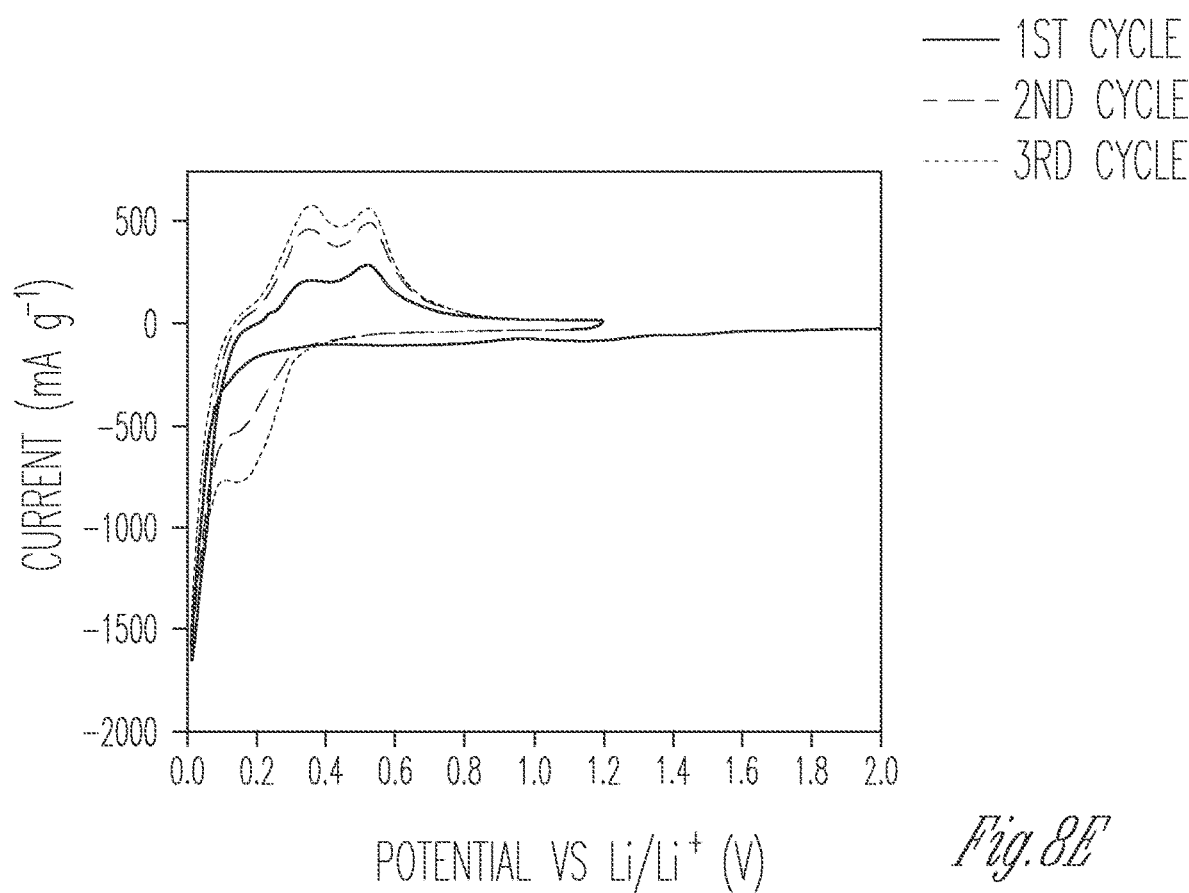

FIG. 5A shows XRD data for products of the magnesiothermic reaction with NaCl (Mg:NaCl=1:1) at 580° C. for 1 h, 3 h, 6 h, 9 h and 12 h. FIG. 5B shows XRD data of the products of FIG. 5A after acid wash.

FIGS. 6A-6E are SEM images of products of the magnesiothermic reaction with NaCl (Mg:NaCl=1:1) at 580 C for 1 h, 3 h, 6 h, 9 h and 12 h.

FIGS. 7A-7E are representative 1st lithiation-delithiation curves of products of the magnesiothermic reaction with NaCl (Mg:NaCl=1:1) at 580 C for 1 h, 3 h, 6 h, 9 h and 12 h.

FIGS. 8A-8E show capacitance-voltage (CV) curves of product of the magnesiothermic with NaCl (Mg:NaCl=1:1) at 580 C for 1 h, 3 h, 6 h, 9 h and 12 h.

FIGS. 9A-9E are TEM images of the products of the magnesiothermic reaction particles to show the details of microstructures.

FIG. 9F shows a 5-point method analysis of the surface area of the products of the magnesiothermic reaction.

Figure 10A:
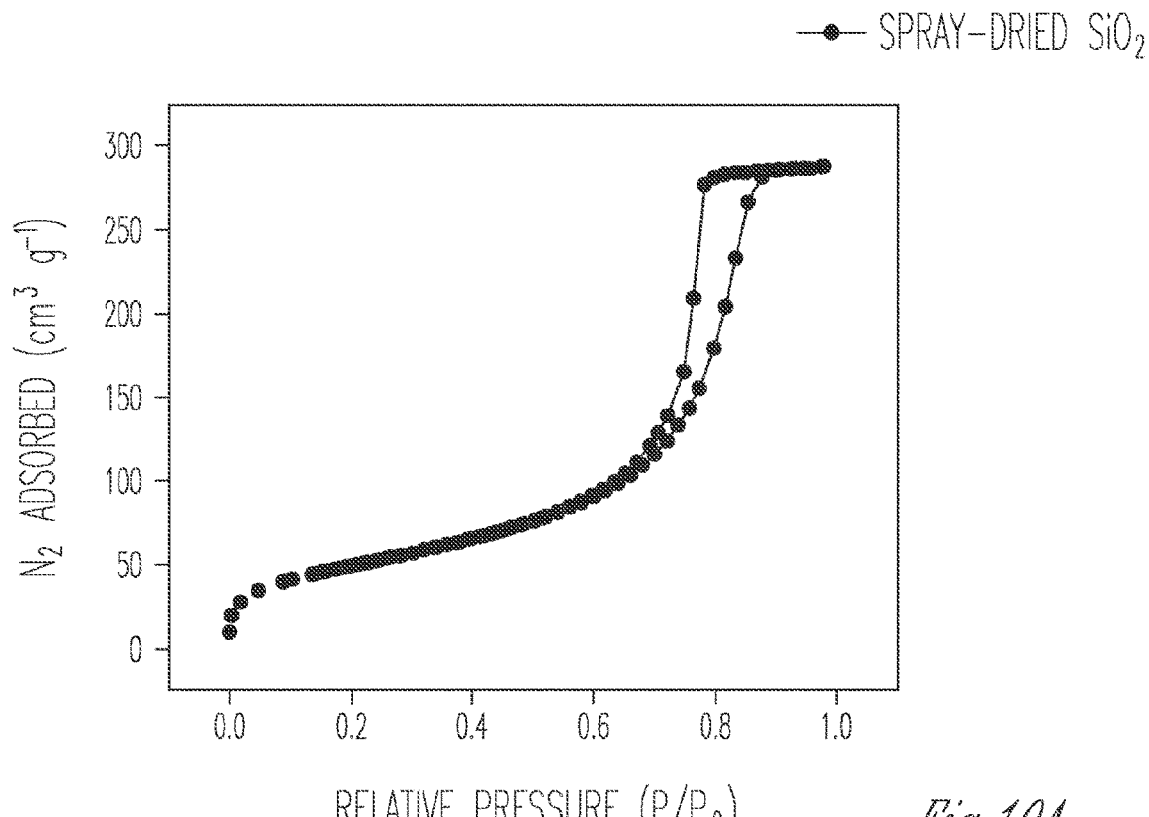
FIGS. 10A-10B show adsorption-desorption isothermal data of the products of the magnesiothermic reaction.
Figure 10B:
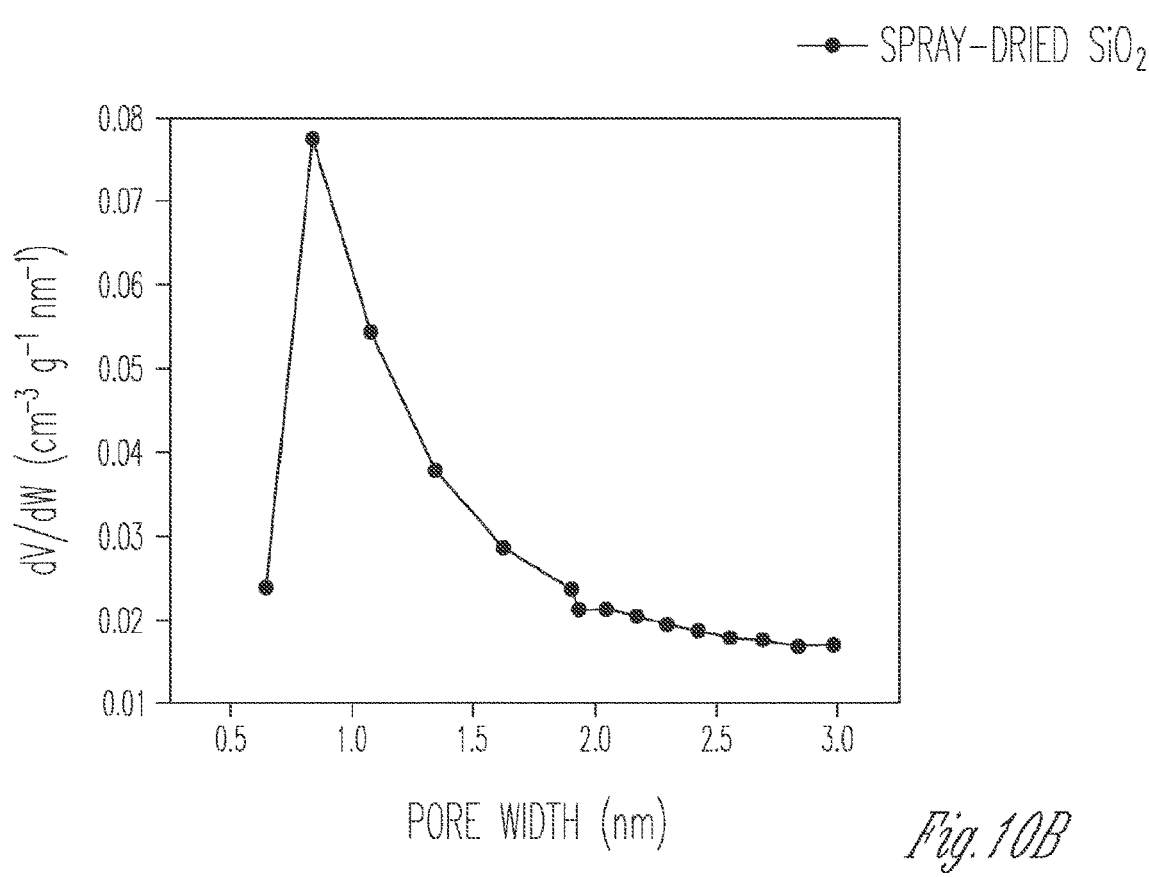

FIG. 10 shows $N_2$ adsorption-desorption isotherms with BET surface area data with inset of pore size distribution of spray-dried $SiO_2$ BET surface area of the spray-dried $SiO_2$ is 178 m2 $g^{-1}$.

Figure 11D:
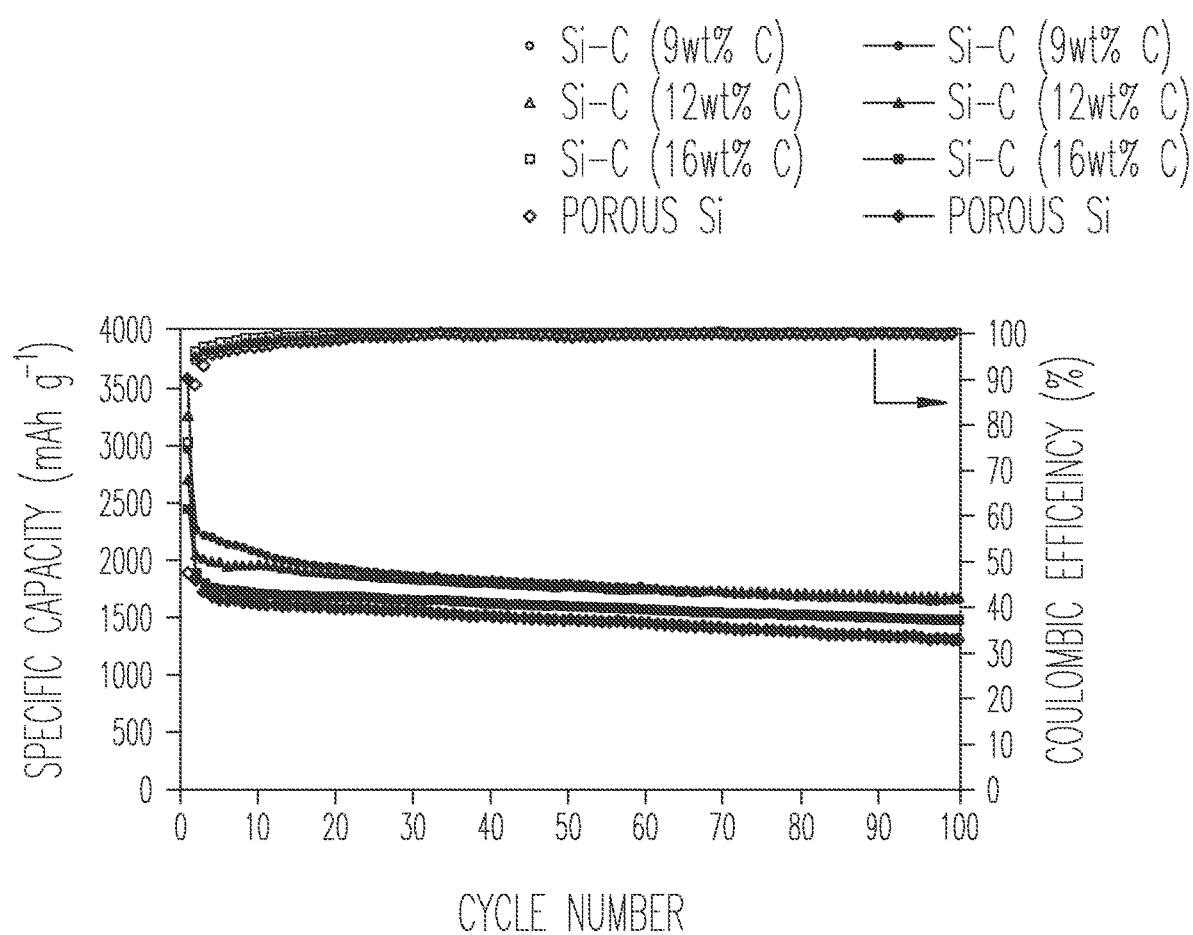
Figure 11E:
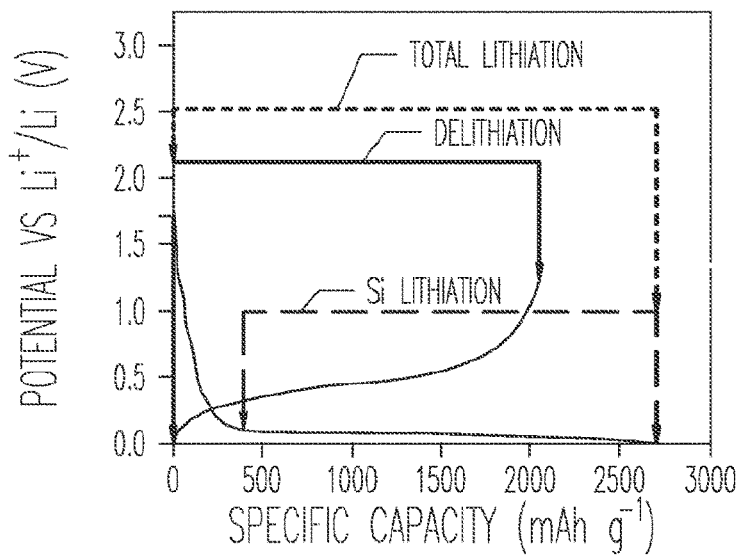
Figure 11F:
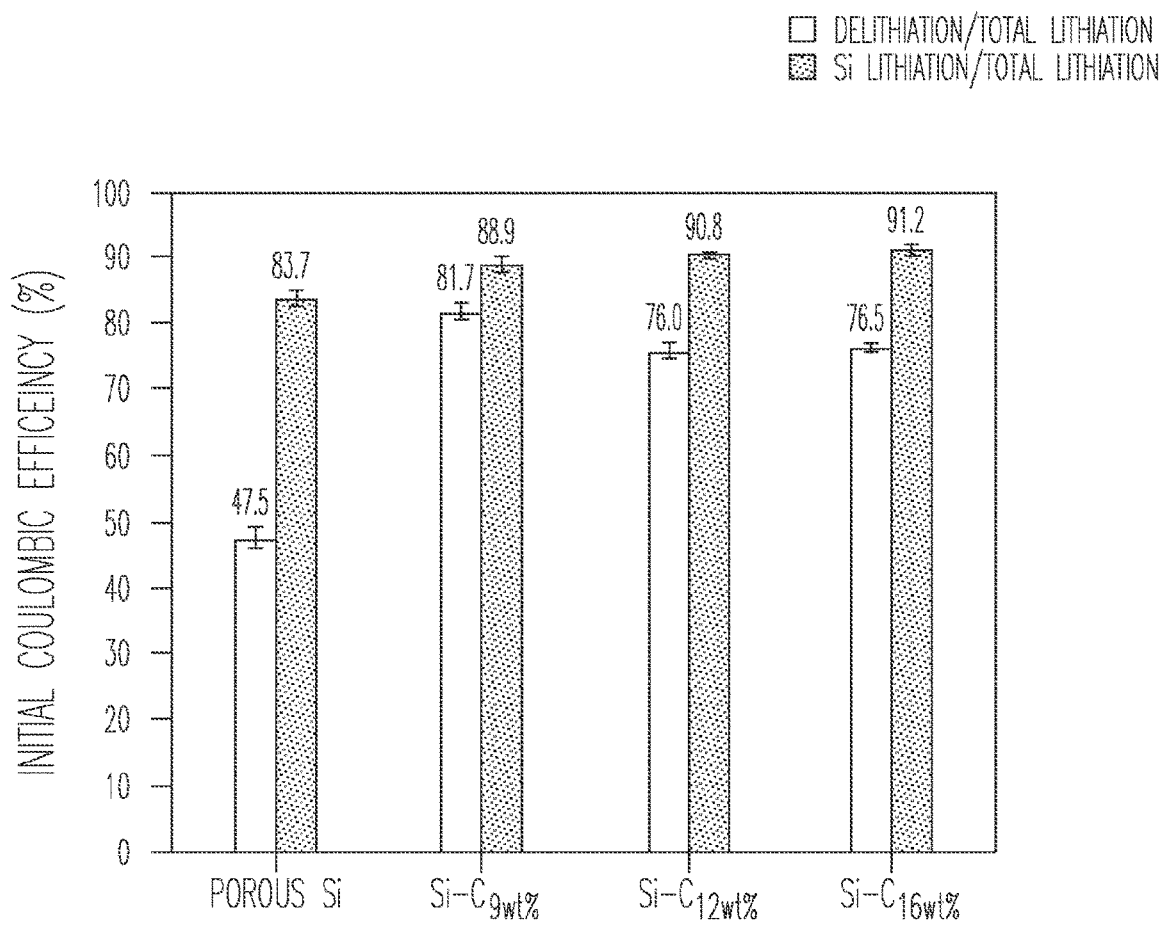

FIG. 11A shows cycle stability of the 5 products above (average of 3 electrodes) at 100 mA $g^{-1}$. FIG. 11B shows delithiation and lithiation curve of Si (6 h) with terms explanation. FIG. 11C shows ICE based on the two calculation methods of Si. FIG. 11D shows cycle stability of the Si—C samples (average of 3 electrodes) at 100 mA $g^{-1}$. FIG. 11E shows delithiation and lithiation curve of Si—C (12 wt. %) with terms explanation. FIG. 11F shows ICE based on the two calculation methods of Si—C samples.

Figure 12A:
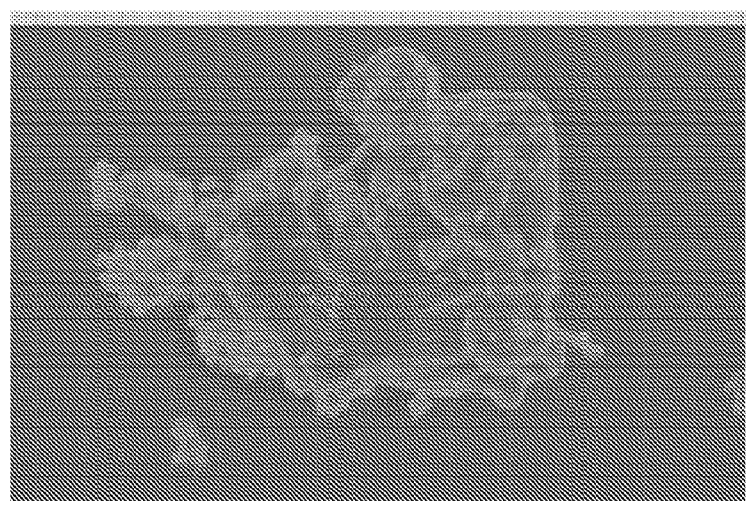
FIGS. 12A-12C are SEM and TEM images of the silicon-carbon composite.
Figure 12B:
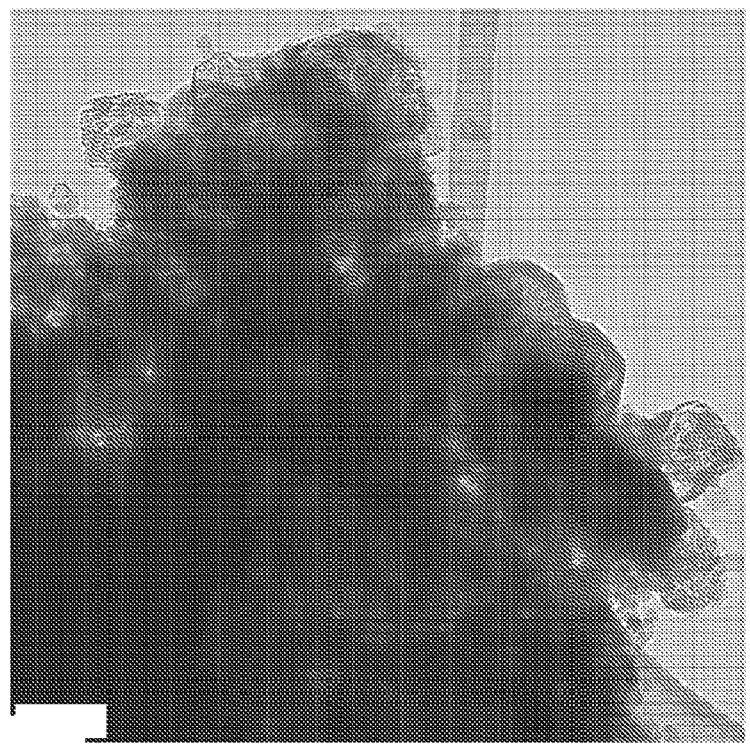
Figure 12C:
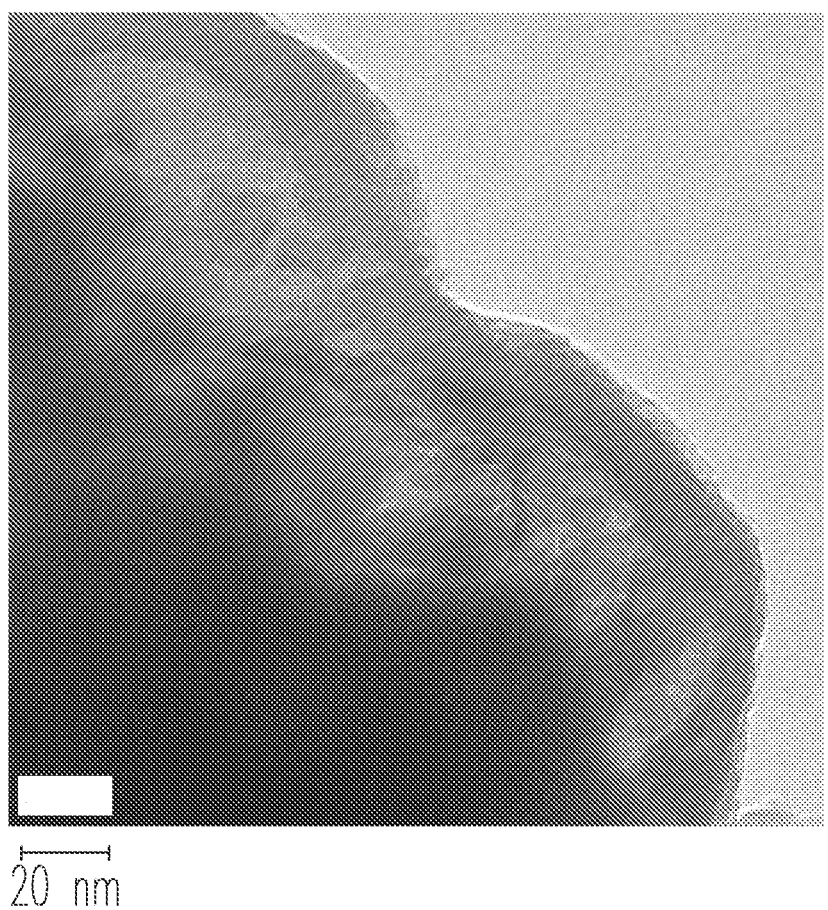

FIG. 12A is an SEM image of the Si—C composite. FIGS. 12B-12C are TEM images of the Si—C composite.

Figure 13A:
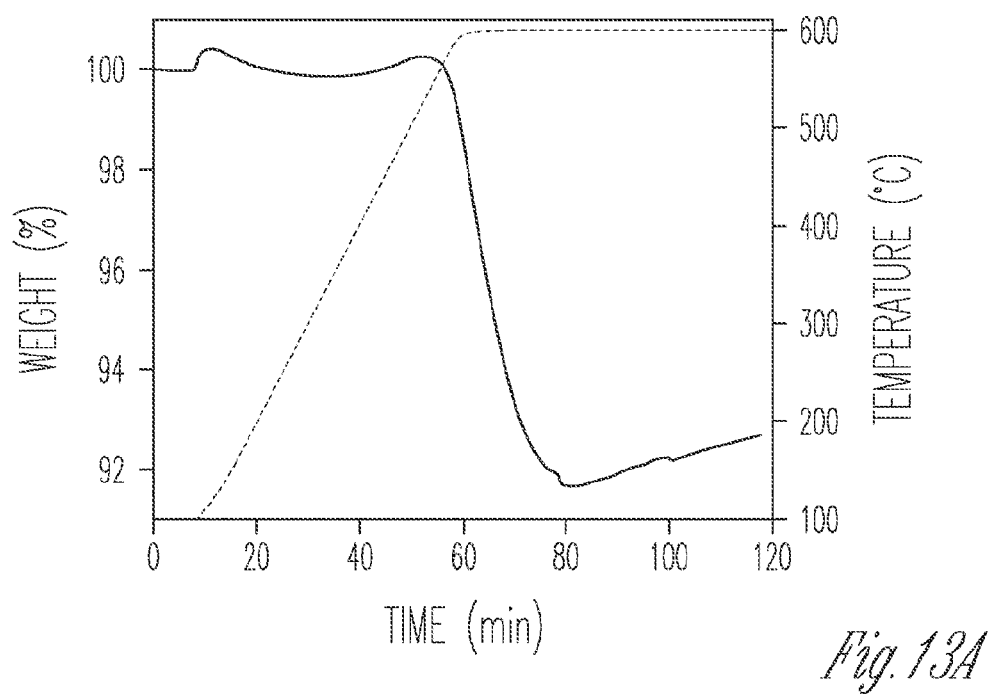
FIGS. 13A-13C show thermogravimetric analysis (TGA) analysis of the silicon-carbon composite.
Figure 13B:
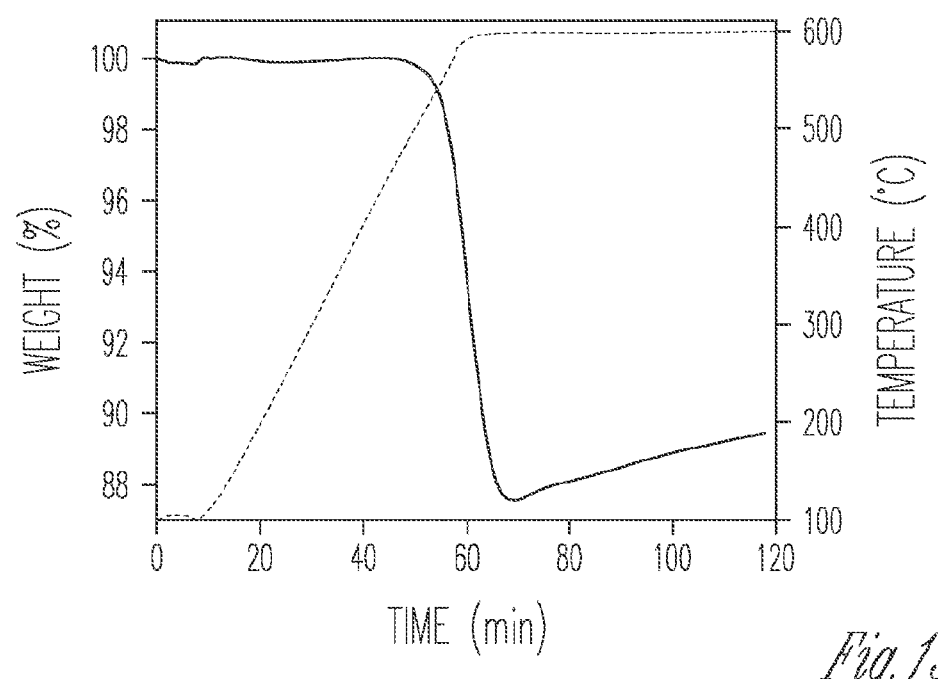
Figure 13C:
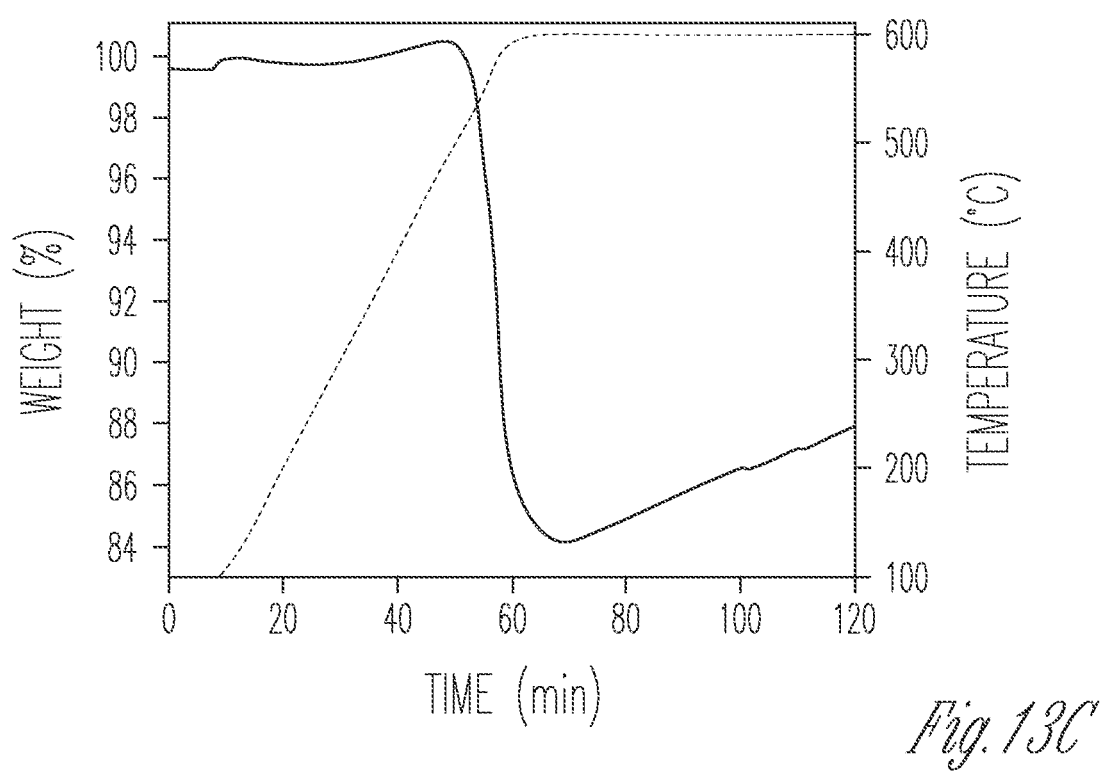

FIGS. 13A-13C are TGA of Si—C composite with carbon ratio 9 wt. %, 12 wt. % and 16 wt. %.

FIG. 14A shows cycle stability of the 10 wt. %, 20 wt. % and 30 wt. % Si—C/graphite hybrid anode at 0.5 mA $cm^{-2}$ in terms of specific capacity. FIG. 14B shows cycle stability at 0.5 mA $cm^{-2}$ in terms of areal capacity. FIG. 14C shows cycle stability of the 10 wt. %, 20 wt. % and 30 wt. % Si—C/graphite hybrid anode at 1 mA $cm^{-2}$ in terms of specific capacity. FIG. 14D shows cycle stability at 1 mA $cm^{-2}$ in terms of areal capacity.

FIG. 15A shows cycle stability of the Si—C/graphite vs $LiFePO_4$ full cell at 0.5 mA $cm^{-2}$ in terms of specific capacity. FIG. 15B shows representative charge and discharge voltage profiles at 0.5 mA $cm^{-2}$. FIG. 15C shows representative charge and discharge voltage profiles at 1 mA $cm^{-2}$.

Figure 16:
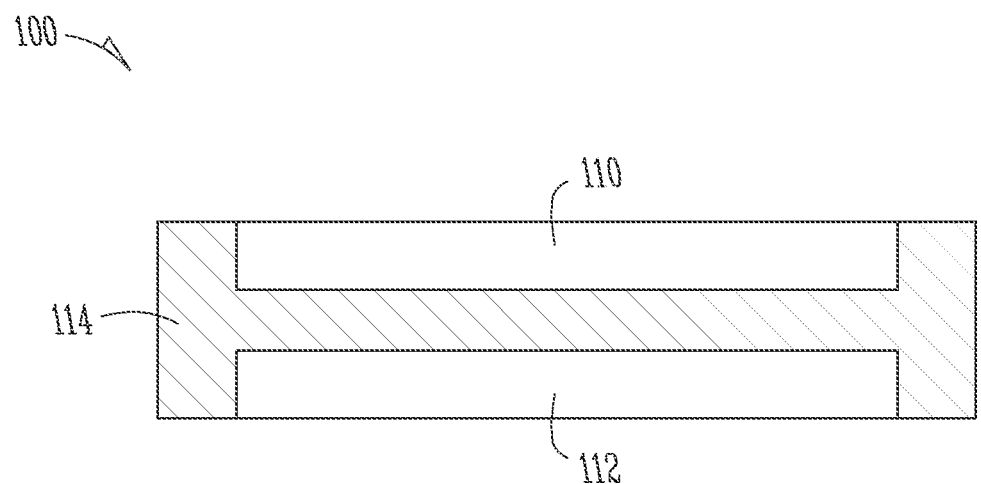
FIG. 16 shows a battery according to an example of the invention.

FIG. 16 shows an example of a battery 100 according to an embodiment of the invention. The battery 100 is shown including an anode 110 and a cathode 112. An electrolyte 114 is shown between the anode 110 and the cathode 112. In one example, the battery 100 is a lithium-ion battery. In one example, the anode 110 includes sulfur as described in examples above. In one example, the cathode 112 includes silicon as described in examples above. In one example, although the invention is not so limited, the battery 100 is formed to comply with a 2032-coin type form factor.

Figure 17:
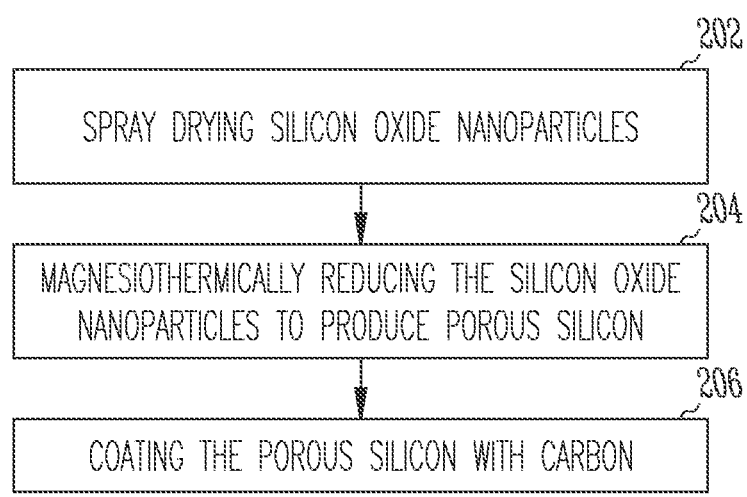
FIG. 17 shows a method of forming a battery according to an example of the invention.

FIG. 17 shows a method of forming a battery according to an example of the invention. The method includes spray drying silicon oxide nanoparticles (step 202), magnesiothermically reducing the silicon oxide nanoparticles to produce porous silicon (step 204) and coating the porous silicon with carbon (step 206).

To better illustrate the method and apparatuses disclosed herein, a non-limiting list of embodiments is provided here.

Example 1 includes an electrode. The electrode includes a silicon-carbon composite and graphite. The silicon-carbon composite includes a porous silicon substrate and a carbon layer on the porous silicon substrate.

Example 2 includes the electrode of example 1, wherein the porous silicon substrate comprises pores, the majority of pores having diameters of 2 nanometers or less.

Example 3 includes the electrode of any one of examples 1-2, wherein the porous silicon substrate comprises pores, the majority of pores having diameters between 2 and 50 nanometers.

Example 4 includes the electrode of any one of examples 1-3, wherein the porous silicon substrate includes a first distribution of pores and a second distribution of pores, wherein the first distribution is different than the second distribution.

Example 5 includes the electrode of any one of examples 1-4, wherein the surface area of the porous silicon substrate is between 22.6 $m^2$ $g^{-1}$ and 178.0 $m^2$ $g^{-1}$.

Example 6 includes the electrode of any one of examples 1-5, wherein the surface area of the porous silicon substrate is between 50.0 $m^2$ $g^{-1}$ and 100.0 $m^2$ $g^{-1}$.

Example 7 includes the electrode of any one of examples 1-6, wherein the carbon layer bulk comprises between 9 wt. % and 16 wt. %.

Example 8 includes the electrode of any one of examples 1-7, wherein the carbon layer comprises 12 wt. %.

Example 9 includes the electrode of any one of examples 1-8, wherein the initial specific capacity comprises between 600 mAh $g^{-1}$ and 1020 mAh $g^{-1}$.

Example 10 includes the electrode of any one of examples 1-9, wherein the electrode has a conversion between 60% and 90%.

Example 11 includes a method of making an electrode material, comprising spray drying silicon oxide nanoparticles, magnesiothermically reducing the silicon oxide nanoparticles to produce porous silicon, and coating the porous silicon with carbon to produce a silicon-carbon composite.

Example 12 includes the method of example 11, wherein magnesiothermically reducing the silicon oxide comprises mechanically mixing the silicon oxide with magnesium and a heat scavenger to form a mixture.

Example 13 includes the method of any of examples 11-12, wherein magnesiothermically reducing the silicon oxide comprises holding the reaction at an isothermal step between 1 hour and 12 hours.

Example 14 includes the method of any of examples 11-13 wherein the isothermal step is between 1 hour and 6 hours.

Example 15 includes the method of any of examples 11-14, wherein magnesiothermically reducing the silicon oxide comprises isothermal steps of 600, 700, or 800 degrees Celsius.

Example 16 includes the method of any of examples 11-15, further including filling graphite with the silicon-carbon composite.

Example 17 includes the method of any of examples 11-16, wherein the graphite comprises between 70 wt. % and 90 wt. % of the electrode material.

Example 18 includes electrode made by the method of example 12.

Example 19 includes the electrode of example 18, wherein the majority of pores have diameters of 2 nanometers or less.

Example 20 includes the electrode of any of example 18-19, wherein the majority of pores have diameters between 2 and 50 nanometers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fail within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, dements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A method of making an electrode material comprising:
spray drying silicon oxide nanoparticles;
magnesiothermically reducing the silicon oxide nanoparticles after spray drying to produce porous silicon; and coating the porous silicon with carbon to produce a silicon-carbon composite.

2. The method of claim 1, wherein magnesiothermically reducing the silicon oxide comprises mechanically mixing the silicon oxide with magnesium and a heat scavenger to form a mixture.

3. The method of claim 2, wherein magnesiothermically reducing the silicon oxide comprises holding the reaction at an isothermal step between 1 hour and 12 hours.

4. The method of claim 3, wherein the isothermal step is between 1 hour and 6 hours.

5. The method of claim 3, wherein magnesiothermically reducing the silicon oxide comprises isothermal steps of 600, 700, or 800 degrees Celsius.

6. The method of claim 1, further comprising filling graphite with the silicon-carbon composite.

7. The method of claim 6, wherein the graphite comprises between 70 wt. % and 90 wt. % of the electrode material.

8. The method of claim 1, wherein coating the porous silicon with carbon to produce a silicon-carbon composite includes chemical vapor deposition of carbon after magnesiothermically reducing the silicon oxide nanoparticles.

\* \* \* \* \*